(12) United States Patent
Kuroki et al.

(10) Patent No.: US 6,961,640 B2
(45) Date of Patent: Nov. 1, 2005

(54) MOTION CONTROL FOR A LEGGED ROBOT

(75) Inventors: Yoshihiro Kuroki, Kanagawa (JP); Tatsuzo Ishida, Tokyo (JP); Jinichi Yamaguchi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 344 days.

(21) Appl. No.: 10/181,307

(22) PCT Filed: Nov. 16, 2001

(86) PCT No.: PCT/JP01/10013

§ 371 (c)(1),
(2), (4) Date: Nov. 25, 2002

(87) PCT Pub. No.: WO02/40222

PCT Pub. Date: May 23, 2002

(65) Prior Publication Data

US 2003/0139849 A1 Jul. 24, 2003

(30) Foreign Application Priority Data

Nov. 17, 2000 (JP) ........................................ 2000-350618

(51) Int. Cl.[7] ............................................. G06F 19/00

(52) U.S. Cl. ........................ 700/245; 700/246; 700/251; 700/253; 700/260; 700/261; 318/568.1; 318/568.12; 318/568.16; 318/568.17; 318/568.19; 318/568.2; 180/8.1; 180/8.6; 901/1; 901/9; 901/46

(58) Field of Search ............... 180/8.6, 8.1; 318/568.19, 318/568.1, 568.12, 568.16, 568.17, 568.2; 700/245, 246, 251, 253, 261; 701/260; 901/1, 9, 46

(56) References Cited

U.S. PATENT DOCUMENTS 6,580,969 B1 * 6/2003 Ishida et al. ................. 700/245
2001/0047226 A1 * 11/2001 Saijo et al. .................. 700/261

FOREIGN PATENT DOCUMENTS

| EP | 0 856 457 | 8/1998 |
|---|---|---|
| EP | 1 018 467 | 7/2000 |
| JP | 5-62363 | 9/1993 |
| JP | 5-285868 | 11/1993 |
| JP | 5-318340 | 12/1993 |
| JP | WO 98/04388 | 2/1998 |
| JP | 10-86081 | 4/1998 |
| JP | 10-217161 | 8/1998 |

OTHER PUBLICATIONS

Galt et al., Smooth and efficient walking motions and control for an 8–legged robot, 1998, IEEE, pp. 1652–1657.*

Villard et al., RALPHY: a dynamic study of a quadruped robot, 1993, IEEE, pp. 106–111.*

* cited by examiner

Primary Examiner—Thomas Black
Assistant Examiner—McDieunel Marc
(74) Attorney, Agent, or Firm—Frommer Lawrence & Haug LLP; William S. Frommer

(57) ABSTRACT

A predetermined action sequence is generated by using basic motion units which include time-sequential motion of each joint and compound motion units in which basic motion units are combined. Motion patterns of a robot including walking are classified into motion units, each motion unit serving as a unit of motion, and one or more motion units are combined to generate various complex motions. Dynamic motion units are defined on the basis of basic dynamic attitudes, and a desired action sequence can be generated by using the dynamic motion units. This is a basic control method necessary for a robot to autonomously perform a continuous motion, a series of continuous motions, or motions which are changed in real-time by commands.

12 Claims, 22 Drawing Sheets

MOTION CONTROL FOR A LEGGED ROBOT

TECHNICAL FIELD

The present invention relates to motion-control apparatuses and motion-control methods for legged mobile robots modeled after legged mobile animals, such as human beings and apes, for their body mechanisms, and more specifically relates to a motion-control apparatus and a motion-control method for a legged mobile robot which has an articulated structure and which performs predetermined action sequences by time-sequentially moving each joint.

In more detail, the present invention relates to a motion-control apparatus and a motion-control method for a legged mobile robot which performs predetermined action sequences by using basic motion units which include time-sequential motion of each joint and compound motion units in which a plurality of basic motions are combined, and specifically relates to a motion-control apparatus and a motion-control method for a legged mobile robot which performs predetermined action sequences by connecting motion units without degrading the stability of the robot body even during fast motion.

BACKGROUND ART

Mechanical apparatuses which move similarly to human beings by making use of electric or magnetic actions are called "robots". The term "robot" is said to be derived from a Slavic word "ROBOTA (slave machine)". In our country, robots came into widespread use at the end of 1960s, and many of them were industrial robots such as manipulators and transfer robots used in factories for the automatic, unmanned production operations.

In recent years, progress has been made in the research and development of legged mobile robots modeled after animals which walk upright on two feet, such as human beings and apes, for their body mechanisms and motions, and they are generally expected to be used for practical purposes. Although attitude control and walking control for legged mobile robots which walk upright on two feet are difficult to achieve compared to crawler-type, four-legged, or six-legged robots, they have advantages in that they are able to perform various kinds of moving operations such as walking on rough surface, including uneven ground and ground with obstacles, and moving on discontinuous surfaces, for example, climbing up and down stairs and ladders.

Legged mobile robots modeled after human beings for their body mechanisms and motions are called "human-shaped" or "humanoid" robots. Humanoid robots are used to assist people, that is, to help human activities in living environments and in other various areas of daily life.

The significance of the research and development of human-shaped, or humanoid, robots can be considered from, for example, the following two points of view.

One point is related to human science. Through the processes of manufacturing robots having structures similar to lower and/or upper limbs of human beings, inventing controlling methods for the robots, and simulating walking motions of human beings, mechanisms of the natural motions of human beings including walking can be elucidated from an engineering point of view. The results of such research will greatly contribute to the development of various other fields of research relating to human motion mechanisms such as ergonomics, rehabilitation engineering, and sports science.

The other point is related to the development of robots which serve as partners for people and assist them in their lives, that is, robots which help human activities in living environments and in other various areas of daily life. This type of robots must learn how to adapt itself to people having different personalities and to various environments while learning motions and manners from people in various aspects of life, and to keep increasing the functionality thereof. Therefore, it is believed that forming robots in a human shape, that is, making the shape or structure of the robots the same as that of human beings, is effective for smooth communication between people and robots.

For example, in the case in which a user (worker) tries to teach a robot a way to pass through a room while avoiding obstacles which should not be stepped on, it is much easier for the user to teach a biped walking robot having the same form as the user than to teach a crawler-type, four-legged, or six-legged robot. In addition, it must also be easier for the robot to learn from the user if the robot has the same form as the user (refer to, for example, "Control of Biped Walking Robot" written by Takanishi in <Koso> No. 25, April 1996, published by Kanto Branch, Society of Automotive Engineers of Japan, Inc.).

Most workspaces and living spaces of human beings, which walk upright on two feet, are designed in accordance with their body mechanisms and the behavioral patterns. Accordingly, there are many barriers for present mechanical systems using wheels or other driving devices as moving units to move in living spaces of human beings. In order for mechanical systems, that is, robots, to carry out various human tasks in place of people and to come into widespread use in people's living spaces, moving areas of the robots are preferably made to be the same as those of people. This is the reason why there are great expectations of putting legged mobile robots to practical use. Accordingly, in order to enhance the adaptability of robots to people's living environments, it is necessary to construct robots such that they walk upright on two feet similarly to human beings.

Humanoid robots may be used, for example, to carry out various difficult operations in industrial activities and production activities in place of people. For example, robots having a structure and functions similar to those of human beings may perform dangerous and difficult operations such as maintenance operations in nuclear power plants, thermal power plants, petrochemical plants, etc., transfer/assembly operations in factories, cleaning operations in high-rise buildings, and rescue operations at fire scenes, in place of people.

In addition, humanoid robots may also be used to "live together" with people in situations more closely related to people's daily life rather than to perform difficult operations in place of people. The goal for robots of this type is to faithfully reproduce the mechanism of whole-body coordinated motions which animals which walk upright on two feet, such as human beings and apes, naturally have, and to move as naturally and smoothly as human beings and apes. In modeling robots after highly intelligent animals such as human beings and apes, four limbs are preferably attached so that motions thereof will look natural. In addition, robots of this type are expected to perform motions having sufficient expressive power. Furthermore, they are required not only to faithfully follow commands input by a user but also to act in a lively manner in response to words and actions of people (such as praising, scolding, hitting, etc.). In this sense, entertainment-type humanoid robots modeled after human beings are rightly called "humanoid" robots.

Legged mobile robots including humanoid robots have a greater degree of freedom and accordingly have a larger number of joint actuators compared to other types of robots. More specifically, legged mobile robots have a large number of controlled objects in the system, so that the amount of calculation for attitude control and stable walking control increases exponentially. In addition, in biped walking robots, the center of gravity of their bodies is placed at a relatively high position and moves greatly during legged locomotion. Accordingly, bodies of biped walking robots of are naturally unstable (an existing area of the ZMP in biped walking robots is significantly small compared with that in four-legged walking robots), so that the amount of calculation for attitude control and stable walking control is extremely large.

In addition, it is almost impossible to perform stable, high-speed, real-time leg motion control independently inside a robot body. Accordingly, in general, legged robots perform walking motions which are determined in advance (for example, Japanese Unexamined Patent Application Publication No. 62-97006 discloses a control device for an articulated walking robot in which control programs are made simpler by using walking-pattern data items stored in advance and the walking-pattern data items can be reliably connected to each other).

A sequence of motions having a certain meaning performed by a robot is called a "behavior" or an action sequence. Action sequences are constructed by combining a plurality of motion pattern data items (also called "actions"), which indicate the time-sequential motion of each joint actuator installed in the robot body. More specifically, motion pattern data items, which indicate the time-sequential motion of each joint, are stored in a predetermined memory device, and when a predetermined action sequence is performed, motion pattern data items corresponding to that action are read out from the memory device and are played back on the robot body.

In order to generate various kinds of action sequences, basic or frequently-used motion pattern data items may be managed in a database and repeatedly used as data components. In the present specification, such motion pattern data items used as data components are referred to as "motion units".

Basic motion units include, for example, a forward-motion start unit, a constant forward walking unit, a forward-motion stop unit, a rearward-motion start unit, a constant rearward walking unit, a rearward-motion stop unit, a leftward (or rightward) motion start unit, a constant leftward (or rightward) walking unit, a leftward (or rightward) motion stop unit, etc.

By combining several basic motion units, more complex motion patterns can be generated. For example, by combining the forward-motion start unit, the constant forward walking unit for N times of forward walking motions, and the forward-motion stop unit, it is possible to make a robot in a stationary state walk forward.

When various basic motion units are stored in a robot in advance, it is relatively easy to make the robot perform complex motions. In the above-described entertainment-type robots, it is strongly demanded that the motions thereof have sufficient expressive power. By changing combinations of basic motion units, various kinds of action sequences can be generated without increasing the number of motion units to be stored.

The basic motion patterns of a robot called motion units are generally described as data items which are arranged time sequentially, each data item indicating positions of each joint in a stationary state. In this case, whether or not two motion units can be connected is determined by taking into account only the continuity of the static positions of each joint (that is, static posture of the robot).

When a robot performs only static or relatively gentle motions, it may be able to perform stable motion by merely connecting motion units indicating only the rotation angles of each joint. However, when the robot performs fast motions wherein acceleration components cannot be ignored, the acceleration components serve as disturbances and affect the robot body so that there is a risk in that the stable motion will be degraded when motion units are connected. In addition, there is also a risk in that connecting points between motion units will be greatly limited due to the effects of the acceleration components. Motions in which the acceleration components cannot be ignored include a motion causing a state in which the ground reaction force is not applied to the robot body such as running motion or transitional motion before starting to run, a motion causing a state in which accelerated motion overpowers the acceleration of gravity and neither one of two feet is in contact with the ground, etc.

DISCLOSURE OF INVENTION

An object of the present invention is to provide an excellent motion-control apparatus and an excellent motion-control method for a legged mobile robot which has an articulated structure and which performs predetermined action sequences by time-sequentially moving each joint.

Another object of the present invention is to provide an excellent motion-control apparatus and an excellent motion-control method for a legged mobile robot which performs predetermined action sequences by using basic motion units which include time-sequential motion of each joint and compound motion units in which basic motions are combined.

Another object of the present invention is to provide an excellent motion-control apparatus and an excellent motion-control method for a legged mobile robot which performs predetermined action sequences by connecting motion units without degrading the stability of the robot body even during fast motion in which acceleration components cannot be ignored.

In order to solve the above-described objects, according to a first aspect of the present invention, a motion-control apparatus or a motion-control method for a legged mobile robot having an articulated structure with at least a plurality of movable legs includes an action-sequence generating unit or step for generating an action sequence by using motion units which store time-sequential motion of each joint; and a motion control unit or step for controlling the motion of each joint in accordance with the action sequence generated. Each motion unit is constructed of basic dynamic attitudes and one or more moving attitudes, the basic dynamic attitudes including at least accelerations or angular accelerations of each joint at the end points of the motion unit, the end points corresponding to the start and the end of the motion, and the moving attitudes connecting the basic dynamic attitudes placed at the end points. The moving attitude may include position data or angle data and speed data or angular speed data of each joint in addition to accelerations or angular accelerations of each joint.

Since each motion unit includes acceleration components at the end points thereof, whether or not two motion units can be connected is determined by taking into account the continuity of the accelerations or angular accelerations of each joint in addition to the continuities of the positions or angles and the speeds or angular speeds of each joint. Accordingly, even when motion units for fast motion such as running and jumping, in which acceleration components cannot be ignored, are connected, the continuity of the accelerations can be ensured, so that the acceleration components do not serve as disturbances. In addition, connecting points between the motion units are not limited.

According to the first aspect of the present invention, in connecting two motion units, the action-sequence generating unit or step may take into account at least the continuities of the positions or angles, speeds or angular speeds, and accelerations or the angular accelerations of each joint between the basic dynamic attitudes at the end points of the motion units which are to be connected. In addition, if the basic dynamic attitudes are not continuous, another basic dynamic attitude, which ensures the continuity, may be inserted between the motion units.

Alternatively, one or more moving attitudes, which ensure the continuity, may be inserted between the motion units.

Alternatively, another motion unit, which ensures the continuity, may be inserted between the motion units.

The motion-control apparatus or the motion-control method according to the first aspect of the present invention may further include a attitude data converting unit or step for converting the basic dynamic attitude into one or more static attitude data items, and, in the motion controlling unit or step, the motion of each joint may be controlled in accordance with the static attitude data items. Accordingly, the concept of the present invention may also be applied to robots which do not accept basic dynamic attitudes including the positions or angles, the speeds or angular speeds, and the accelerations or angular accelerations of each joint, that is, robots which are driven on the basis of position data only.

In addition, according to a second aspect of the present invention, a method for generating a motion unit which stores time-sequential motion of each joint in a legged mobile robot having an articulated structure with at least a plurality of movable legs includes the steps of setting provisional basic dynamic attitudes and a provisional stabilization condition, the provisional basic dynamic attitudes including at least accelerations or angular accelerations of each joint at the end points of the motion unit; setting provisional moving attitudes which are inserted between the provisional basic dynamic attitudes placed at the end points in the motion unit; and performing stabilization process for the motion pattern of the motion unit having the provisional basic dynamic attitudes.

The method for generating the motion unit according to the second aspect of the present invention may further include the step of converting the motion unit including the basic dynamic attitudes into a basic static attitude unit including at least three basic static attitudes. In such a case, the concept of the present invention may also be applied to robots which do not accept basic dynamic attitudes including the positions or angles, the speeds or angular speeds, and the accelerations or angular accelerations of each joint, that is, robots which are driven on the basis of position data only.

In addition, the step of performing stabilization process for the motion pattern of the motion unit may include:

(a) a sub-step for setting a leg motion, a trunk motion, an upper-limb motion, and attitude and height of a hip which are used for generating the motion unit;

(b) a sub-step for setting a ZMP trajectory on the basis of the leg motion set at sub-step (a); and (c) a sub-step for obtaining the solution of the hip motion with which the moment on the ZMP set at sub-step (b) is balanced.

Further objects, features and advantages of the present invention will become apparent from the following description of the preferred embodiments with reference to the attached drawings.

BEST MODE FOR CARRYING OUT THE INVENTION

An embodiment of the present invention will be described below in detail with reference to the accompanying drawings.

Figure 1:
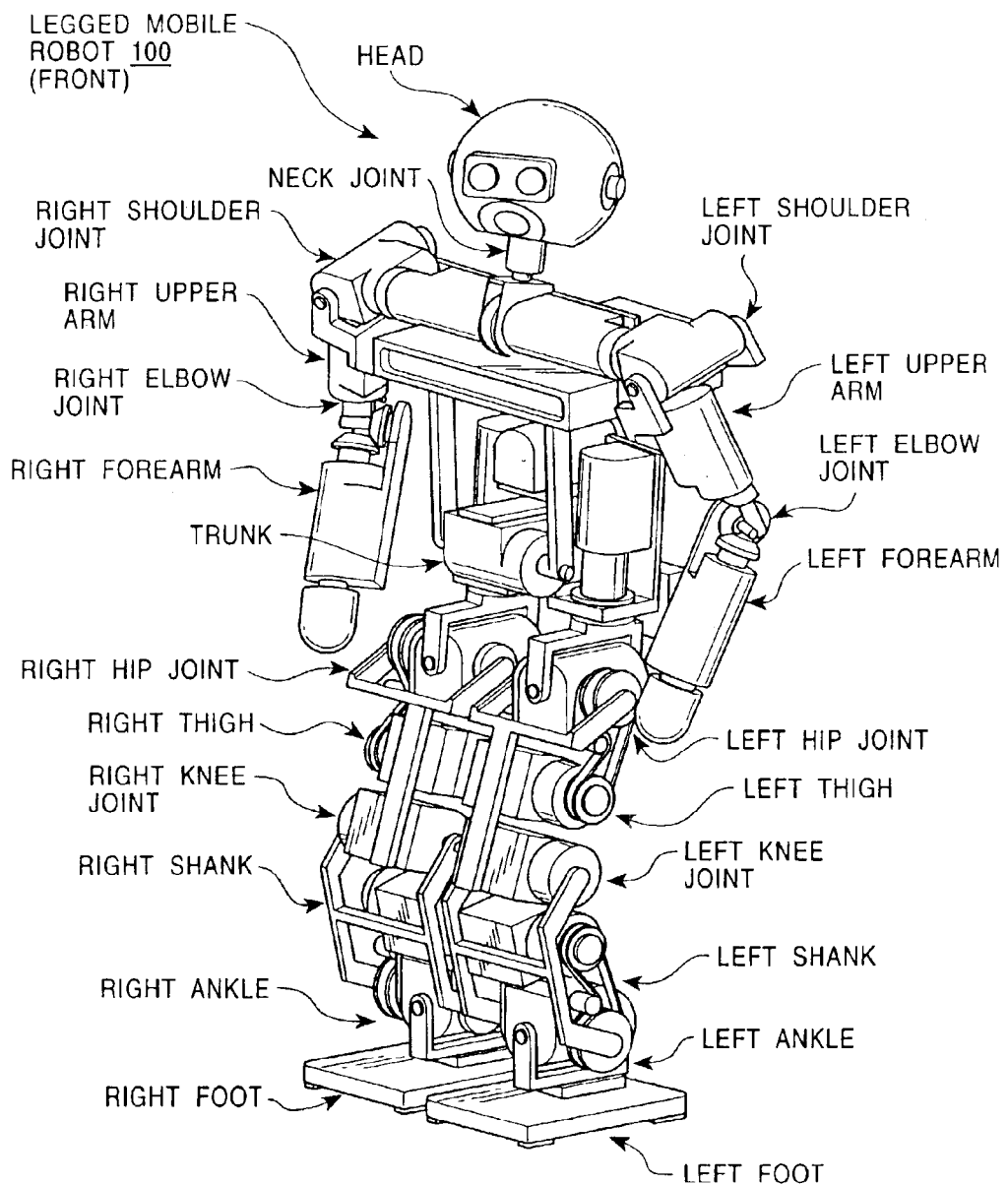
FIG. 1 is a front view of a legged mobile robot 100 according to an embodiment of the present invention.
Figure 2:
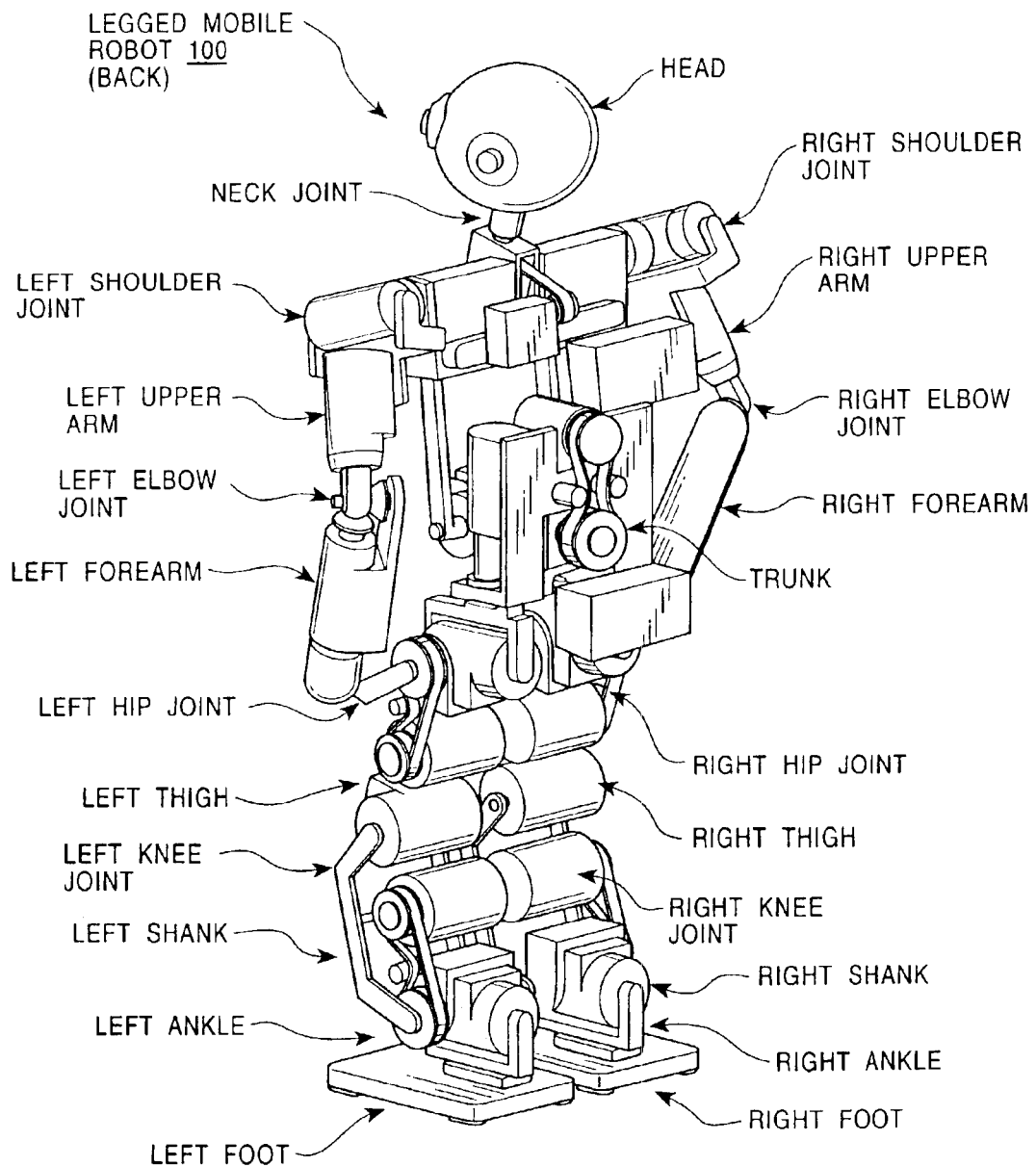
FIG. 2 is a rear view of the legged mobile robot 100 according to the embodiment of the present invention.

FIGS. 1 and 2 are a front view and a rear view, respectively, of a "human-shaped" or "humanoid" legged mobile robot 100 according to an embodiment of the present invention in an upright position. As shown in the figures, the legged mobile robot 100 includes left and right lower limbs used for legged locomotions, a trunk, left and right upper limbs, a head, and a control unit.

Each of the left and right lower limbs includes a thigh, a knee joint, a shank, an ankle, and a foot, and is connected to the trunk at the bottom end of the trunk by a hip joint. In addition, each of the left and right upper limbs includes an upper arm, an elbow joint, and a forearm. The left and right upper limbs are connected to the trunk at the upper left end and the upper right end, respectively, of the trunk by shoulder joints. The head is connected to the trunk at the center of the top end of the trunk by a neck joint.

The control unit includes a housing containing a controller (a main control unit), which controls actuators for each joint forming the legged mobile robot 100 and processes external input from sensors (described below), and peripheral devices such as a power supply circuit. The control unit may also include a communication interface or a communication device for remote control. Although the control unit is mounted at the back of the legged mobile robot 100 in FIGS. 1 and 2, the position where the control unit is placed is not limited.

Figure 3:
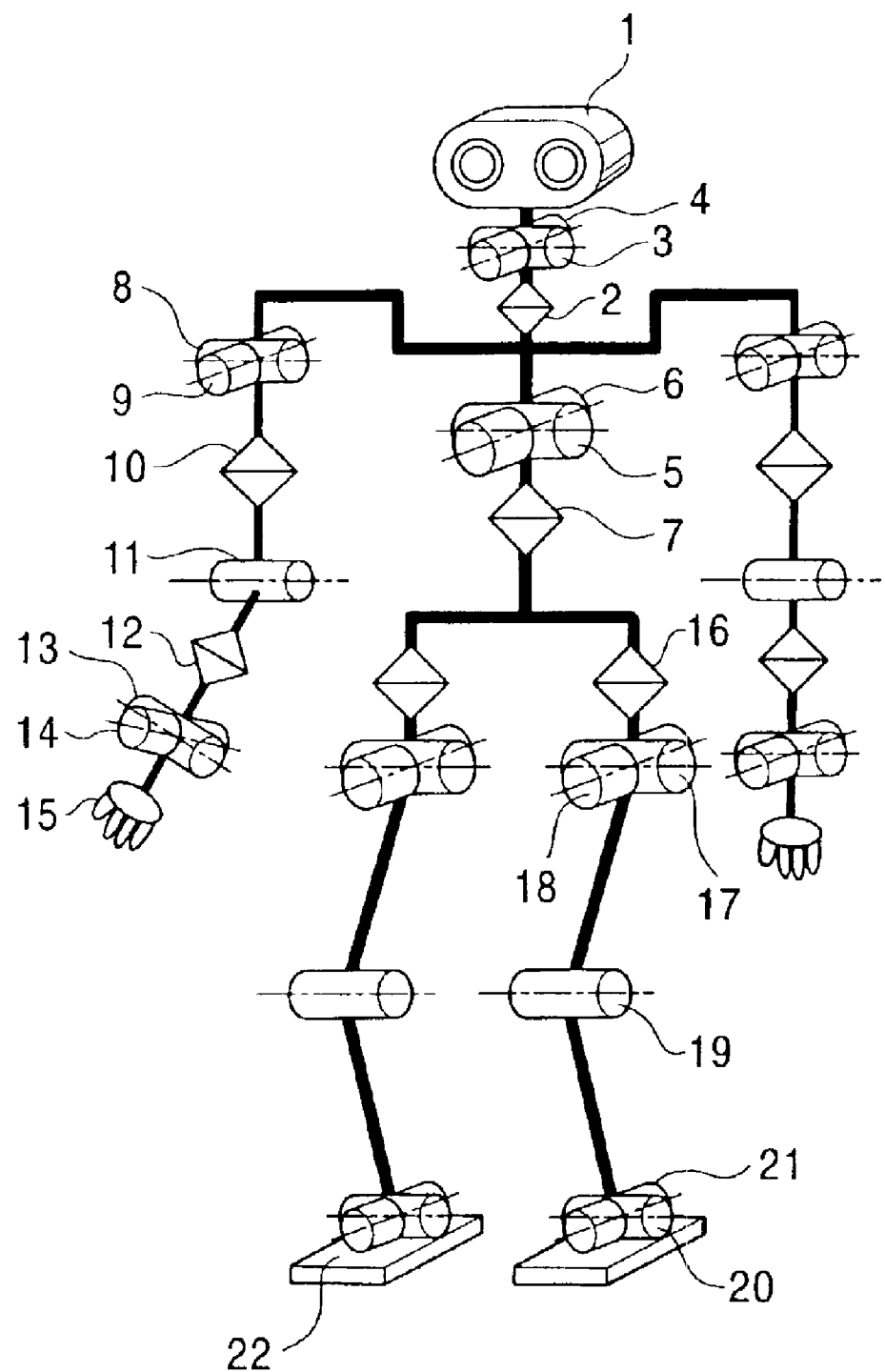
FIG. 3 is a schematic diagram illustrating the freedom of the joint structure of the legged mobile robot 100 according to the present embodiment.

FIG. 3 is a schematic diagram illustrating the freedom of the joint structure of the legged mobile robot 100 according to the present embodiment. As shown in the figure, the legged mobile robot 100 is constructed of an upper body including two arms and a head 1, the two lower limbs used for legged locomotions, and the trunk which connects the upper limbs and the lower limbs.

The neck joint supporting the head 1 has three degrees of freedom corresponding to a neck-joint yaw axis 2, a neck-joint pitch axis 3, and a neck-joint roll axis 4.

Each arm includes a shoulder-joint pitch axis 8, a shoulder-joint roll axis 9, an upper arm yaw axis 10, an elbow-joint pitch axis 11, a forearm yaw axis 12, a wrist-joint pitch axis 13, a wrist-joint roll axis 14, and a hand 15. Each hand 15 includes a plurality of fingers and has an articulated structure with multiple degrees of freedom. However, since the motion of each hand 15 does not affect the stable attitude control and walking motion control of the robot 100, the number of degrees of freedom of each hand is assumed to be zero in the present specification. Accordingly, it is assumed that each of the left and right arms has seven degrees of freedom.

The trunk has three degrees of freedom corresponding to a trunk pitch axis 5, a trunk roll axis 6, and a trunk yaw axis 7.

Each of the left and right legs forming the lower limbs includes a hip-joint yaw axis 16, a hip-joint pitch axis 17, a hip-joint roll axis 18, a knee-joint pitch axis 19, an ankle-joint pitch axis 20, a joint roll axis 21, and a foot (or sole) 22. The points where the hip-joint pitch axes 17 and the hip-joint roll axes 18 intersect define the positions of the hip joints in the legged mobile robot 100 according to the present embodiment. Although each foot (or sole) 22 of a human body has an articulated structure with multiple degrees of freedom, the number of degrees of freedom of each sole of the legged mobile robot 100 is assumed to be zero. Accordingly, it is assumed that each of the left and right legs has six degrees of freedom.

To sum up, the total number of degrees of freedom of the legged mobile robot 100 according to the present embodiment is $3+7\times2+3+6\times2=32$. However, the number of degrees of freedom of the legged mobile robot 100 is not necessarily limited to 32. The number of degrees of freedom may of course be suitably increased or reduced in accordance with constraints on design and with the manufacturing processes, required specifications, etc.

The above-described freedom of the legged mobile robot 100 is provided by actuators. In order to satisfy the requirements for reducing excessive swellings in the legged mobile robot 100 and for making its appearance as similar to the natural form of human beings as possible and the requirements for performing attitude control of the robot having the biped walking structure, which is naturally unstable, small, light actuators are preferably used. In the present embodiment, small AC servo actuators which are directly connected to gears and which includes a motor unit in which a servo control system formed in a single chip is installed are used in the legged mobile robot 100. A small AC servo actuator of this type is disclosed in, for example, Japanese Unexamined Patent Application Publication No. 2000-299970 (Japanese Patent Application No. 11-33386), which has been assigned to the applicant of the present invention.

Figure 4:
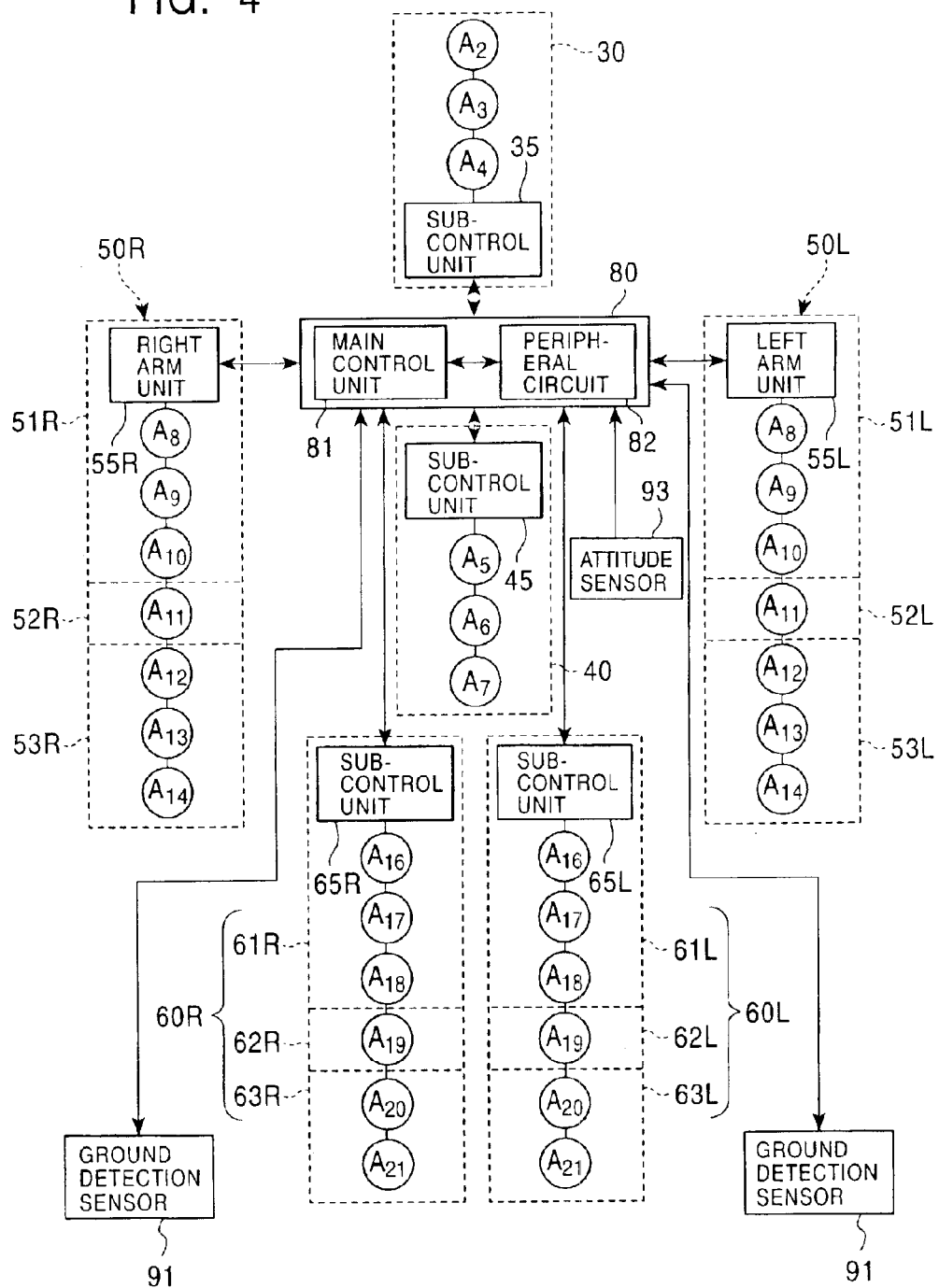
FIG. 4 is a schematic diagram showing the structure of a control system of the legged mobile robot 100 according to the present embodiment.

FIG. 4 is a schematic diagram showing the structure of a control system of the legged mobile robot 100 according to the present embodiment. As shown in the figure, the legged mobile robot 100 includes mechanism units 30, 40, 50R/L, and 60R/L corresponds to four limbs of a human body, and a control unit 80 which performs adaptive control for the coordinated motions between each mechanism unit (hereinafter, R and L attached at the end of reference numerals represent right and left, respectively).

The overall motion of the legged mobile robot 100 is controlled by the control unit 80. The control unit 80 includes a main control unit 81 containing main circuit components (not shown) such as a central processing unit (CPU) chip, a memory chip, etc., and a peripheral circuit 82 containing a power supply, an interface for transmitting data and commands between each component of the legged mobile robot 100, an external memory device, etc. (all of which are not shown).

In the present embodiment, the legged mobile robot 100 includes a battery (not shown in FIG. 4) as the power supply, so that the legged mobile robot 100 can move autonomously. When the legged mobile robot 100 is constructed as an autonomous robot by using a battery, its moving area is not physically limited by, for example, the length of a power supply cable, the position of a commercial power outlet, etc., and the legged mobile robot 100 is able to walk freely. In addition, the risk in that the robot body will be obstructed by a power supply cable while walking or performing other motions using upper limbs can be eliminated, and the legged mobile robot 100 can easily move around a large workspace.

The freedom of each joint of the legged mobile robot 100 shown in FIG. 3 is provided by actuators corresponding to each joint. More specifically, the head unit 30 includes a neck-joint yaw actuator $A_2$, a neck-joint pitch actuator $A_3$, and a neck-joint roll actuator $A_4$ corresponding to the neck-joint yaw axis 2, the neck-joint pitch axis 3, and the neck-joint roll axis 4, respectively.

In addition, the trunk unit 40 includes a trunk pitch actuator $A_5$, a trunk roll actuator $A_6$, and a trunk yaw actuator $A_7$ corresponding to the trunk pitch axis 5, the trunk roll axis 6, and the trunk yaw axis 7, respectively.

The arm units 50R/L can be divided into upper arm units 51R/L, elbow joint units 52R/L, and forearm units 53R/L, and each of the arm units 50R/L includes a shoulder-joint pitch actuator $A_8$, a shoulder-joint roll actuator $A_9$, an upper arm yaw actuator $A_{10}$, an elbow-joint pitch actuator $A_{11}$, an elbow-joint roll actuator $A_{12}$, a wrist-joint pitch actuator $A_{13}$, and a wrist-joint roll actuator $A_{14}$, corresponding to the shoulder-joint pitch axis 8, the shoulder-joint roll axis 9, the upper arm yaw axis 10, the elbow-joint pitch axis 11, the elbow-joint roll axis 12, the wrist-joint pitch axis 13, and the wrist-joint roll axis 14, respectively.

In addition, the leg units 60R/L can be divided into thigh units 61R/L, knee units 62R/L, and shank units 63R/L, and each of the leg units 60R/L is includes a hip-joint yaw actuator $A_{16}$, a hip-joint pitch actuator $A_{17}$, a hip-joint roll actuator $A_{18}$, a knee-joint pitch actuator $A_{19}$, an ankle-joint pitch actuator $A_{20}$, and an ankle-joint roll actuator $A_{21}$ corresponding to the hip-joint yaw axis 16, the hip-joint pitch axis 17, the hip-joint roll axis 18, the knee-joint pitch axis 19, the ankle-joint pitch axis 20, and the ankle-joint roll axis 21, respectively.

The above-described joint actuators $A_2$, $A_3$, . . . , are preferably the above-described small AC servo actuators which are directly connected to gears and which includes a motor unit in which a servo control system formed in a single chip is installed.

The head unit 30, the trunk unit 40, the arm units 50, and the leg units 60 are provided with sub-control units 35, 45, 55, and 65, respectively, for controlling the actuators. In addition, the leg units 60R and 60L are provided with ground detection sensors 91 and 92 which detect whether or not the soles of the leg units 60R and 60L are touching the ground, and the trunk unit 40 is provided with a attitude sensor 93.

The attitude sensor 93 is constructed of, for example, an acceleration sensor and a gyro sensor, and the ground detection sensors 91 and 92 are constructed of, for example, proximity sensors or micro switches disposed on the soles.

The inclination and attitude of the trunk are determined by the attitude sensor 93, and whether the left and right legs are on or off the ground while the legged mobile robot 100 walks or runs is determined by the ground detection sensors 91 and 92.

The control unit 80 dynamically corrects the control values in response to the outputs from the sensors 91 to 93. More specifically, the control unit 80 suitably controls the sub-control units 35, 45, 55, and 65, so that the motions of the upper limbs, the trunk, and the lower limbs of the legged mobile robot 100 are coordinated.

The main control unit 81 generates an action plan in accordance with external factors such as a command from the user, the internal state determined by an emotion model, an instinct model, a learning model, etc., and makes the robot perform a desired action. The motion units registered in a database of the external memory device, which is locally connected to the main control unit 81, are sequentially read out and an action sequence is generated by connecting one or more motion units. The action sequence is played back on the robot body, thereby making the robot 100 perform the desired action. Although the external memory device is mounted in, for example, the peripheral circuit 82, it is not shown in FIG. 4 in order to make the figure simple.

The legged mobile robot 100 according to the present embodiment moves mainly on its legs. In biped walking robots, the center of gravity of their bodies is placed at a relatively high position and moves greatly during legged locomotion, so that attitude control and stable walking control are extremely important. The main control unit 81 performs attitude control and stable walking control by using a zero moment point (ZMP) as a stability determination standard. More specifically, the main control unit 81 sets a leg motion, a ZMP trajectory, a trunk motion, an upper limb motion, a vertical position of the hip, etc., and sends commands corresponding to the settings to the sub-control units 35, 45, 55, and 65.

"ZMP" is a point on the ground at which the moment caused by the ground reaction force during walking is zero, and "ZMP trajectory" is a locus along which the ZMP moves while the robot 100 walks. The concept of the ZMP and the application of the ZMP as the stability determination standard of a walking robot are described in "Legged Locomotion Robots" written by Miomir Vukobratovic ("Walking Robots and Artificial Legs" written by Ichiro Kato et al., published by The Nikkan Kogyo Shinbun, Ltd.).

The sub-control units 35, 45, . . . , decode the commands transmitted from the main control unit 81 and transmit drive control signals to the corresponding joint actuators A2, A3, . . .

A sequence of motions having a certain meaning performed by the legged mobile robot 100 is called a "behavior" or an action sequence. Action sequences are constructed by combining one or more motion units, which indicate the time-sequential motion of each joint actuator installed in the robot body. More specifically, motion units, which indicate the time-sequential motion of each joint, are stored in a predetermined memory device (which is mounted in, for example, the peripheral circuit 82), and when a predetermined action sequence is performed, motion units corresponding to that action are sequentially read from the memory device, are connected to each other, and are played back on the robot body.

Figure 5:
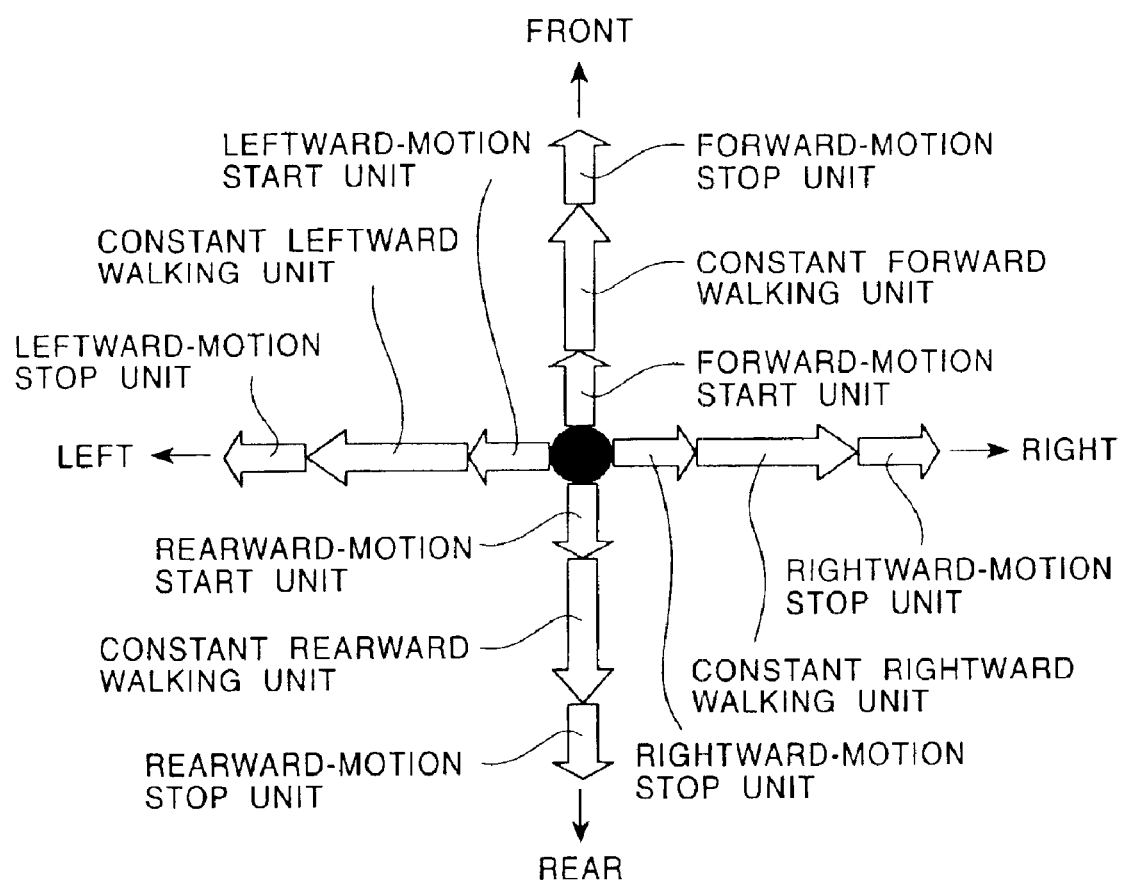
FIG. 5 is a diagram showing an example of a motion unit structure.

FIG. 5 shows an example of a motion unit structure. The example shown in FIG. 5 includes a forward-motion start unit, a constant forward walking unit, a forward-motion stop unit, a rearward-motion start unit, a constant rearward walking unit, a rearward-motion stop unit, leftward (and rightward) motion start units, constant leftward (and rightward) walking units, and leftward (and rightward) motion stop units.

Motion units shown in FIG. 5 are used for moving the legged mobile robot 100 forward, rearward, leftward, and rightward.

The forward-motion start unit indicates a motion pattern from a stationary attitude to a dynamic two-leg support attitude I, and stores walking cycle data and step data. The constant forward walking unit indicates a motion pattern from the dynamic two-leg support attitude I to the dynamic two-leg support attitude I, and stores walking cycle data and step data. The forward-motion stop unit indicates a motion pattern from the dynamic two-leg support attitude I to the stationary attitude, and stores walking cycle data and step data.

The rearward-motion start unit indicates a motion pattern from a stationary attitude to a dynamic two-leg support attitude II, and stores walking cycle data and step data. The constant rearward walking unit indicates a motion pattern from the dynamic two-leg support attitude II to the dynamic two-leg support attitude II, and stores walking cycle data and step data. The rearward-motion stop unit indicates a motion pattern from the dynamic two-leg support attitude II to the stationary attitude, and stores walking cycle data and step data.

The leftward-motion start unit indicates a motion pattern from a stationary attitude to a dynamic two-leg support attitude III, and stores walking cycle data and step data. The constant leftward walking unit indicates a motion pattern from the dynamic two-leg support attitude III to the dynamic two-leg support attitude III, and stores walking cycle data and step data. The leftward-motion stop unit indicates a motion pattern from the dynamic two-leg support attitude III to the stationary attitude, and stores walking cycle data and step data.

The rightward-motion start unit indicates a motion pattern from a stationary attitude to a dynamic two-leg support attitude IV, and stores walking cycle data and step data. The constant rightward walking unit indicates a motion pattern from the dynamic two-leg support attitude IV to the dynamic two-leg support attitude IV, and stores walking cycle data and step data. The rightward-motion stop unit indicates a motion pattern from the dynamic two-leg support attitude IV to the stationary attitude, and stores walking cycle data and step data.

Figure 6:
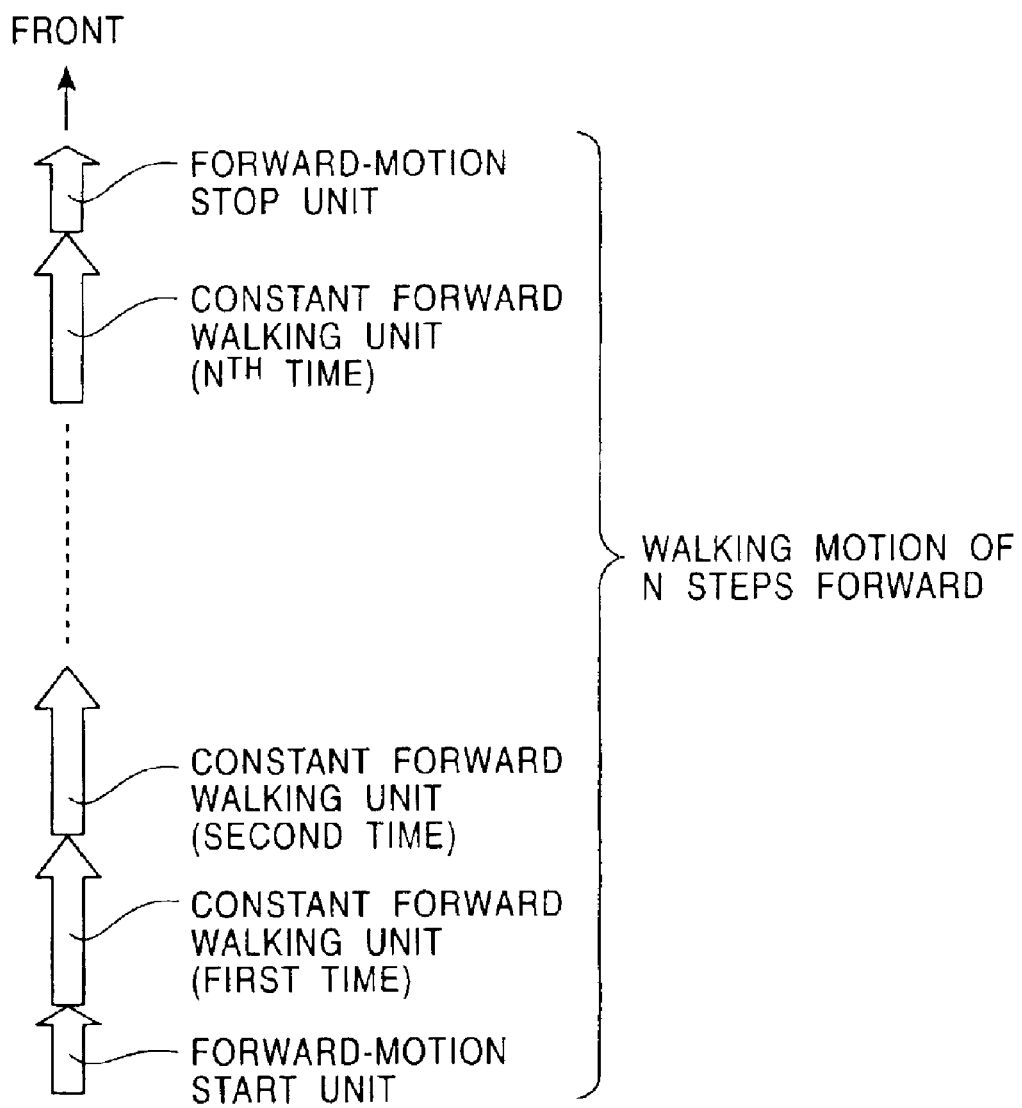
FIG. 6 is a diagram showing an example of an action sequence in which a plurality of motion units are combined to generated walking motion of a predetermined distance.

By combining several basic motion units, more complex motion patterns can be generated. For example, by combining three kinds of motion units, i.e., the forward-motion start unit, the constant forward walking unit for N times of forward walking motions, and the forward-motion stop unit, it is possible to generate an action sequence in which the robot walks a predetermined distance as shown in FIG. 6.

Figure 7:
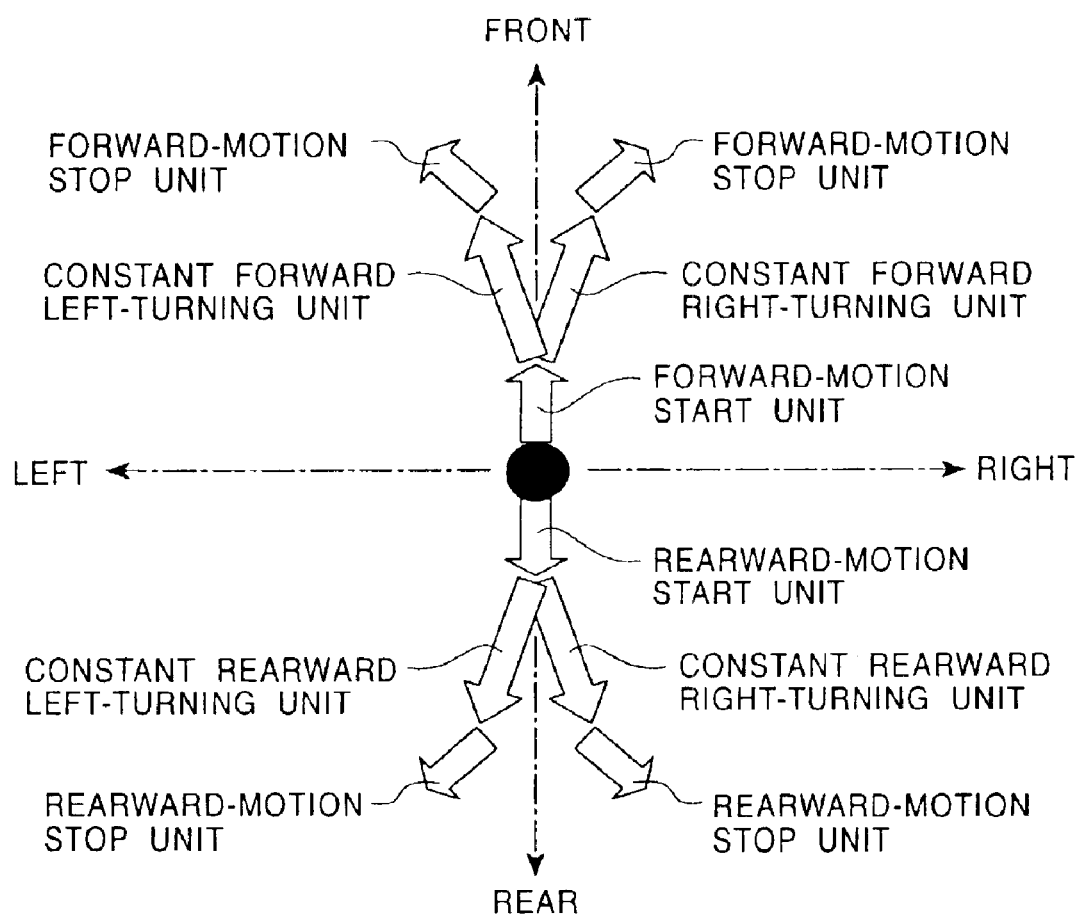
FIG. 7 is a diagram showing another example of a motion unit structure.

FIG. 7 shows another example of a motion unit structure. The example shown in FIG. 7 includes a constant forward left-turning unit, a constant forward right-turning unit, a constant rearward left-turning unit, and a constant rearward right-turning unit. By combining the constant turning units with the above-described forward-motion start unit, forward-motion stop unit, rearward-motion start unit, and rearward-motion stop unit, action sequences in which the legged mobile robot 100 turns left or right while walking can be generated.

In addition, a fine-adjustment forward walking unit, a fine-adjustment rearward walking unit, a fine-adjustment leftward walking unit, and a fine-adjustment rightward walking unit may also be provided in order to perform fine adjustment of each type of motion such as forward, leftward, rightward, rearward, and turning motions. In addition, for a relatively fast forward motion, an accelerating forward walking unit may be provided between the forward-motion starting unit and the constant forward walking unit and a decelerating forward walking unit may be provided between the constant forward walking unit and the forward-motion stopping unit.

Figure 8:
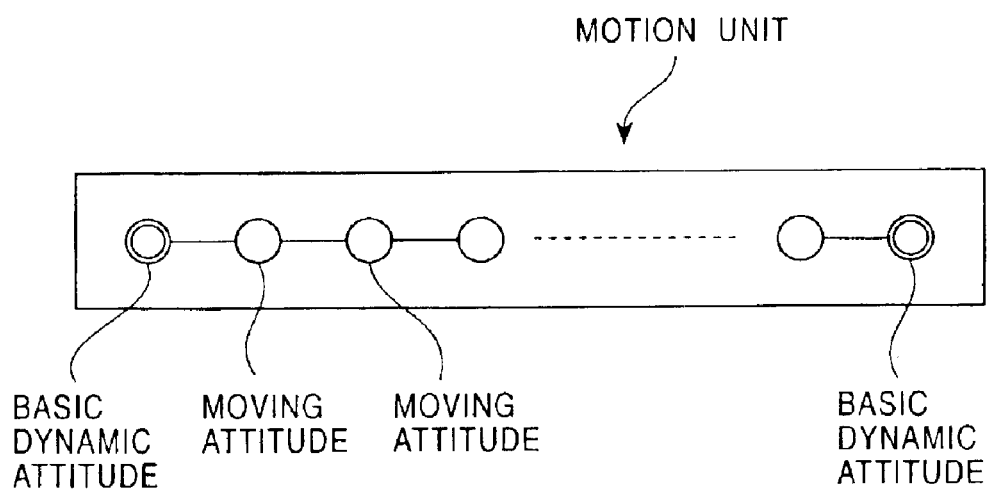
FIG. 8 is a schematic diagram showing the construction of a motion unit.

FIG. 8 is a schematic diagram showing the construction of a motion unit used in the legged mobile robot 100 according to the present embodiment. A single motion unit includes basic dynamic attitudes at the end points corresponding to the start and the end of the motion and one or more moving attitudes which connects the basic dynamic attitudes at the end points.

The basic dynamic attitudes include positions (that is, rotation angles), speeds or angular speeds, and accelerations or angular accelerations of each joint.

The moving attitudes may be static moving attitudes which indicate a stationary state of the robot body (that is, the moving attitudes may include only position data). Alternatively, the moving attitudes may be dynamic moving attitudes which indicate a dynamic state of the robot body. More specifically, the moving attitudes may store only the position data of each joint, or additionally store speed data and acceleration data thereof.

Since each motion unit includes acceleration components at the end points thereof, whether or not two motion units can be connected is determined by taking into account the continuity of the accelerations in addition to the continuity of the positions of each joint. Accordingly, even when motion units for fast motion, in which acceleration components cannot be ignored, are connected, the continuity of the accelerations can be ensured, so that the acceleration components do not serve as disturbances. In addition, connecting points between the motion units are not limited.

Motions in which the acceleration components cannot be ignored include a motion causing a state in which the ground reaction force is not applied to the robot body such as running motion or transitional motion before starting to run, a motion causing a state in which accelerated motion overpowers the acceleration of gravity and neither one of two feet is in contact with the ground, etc.

Next, processes to connect two motion units will be described below.

Figure 9:
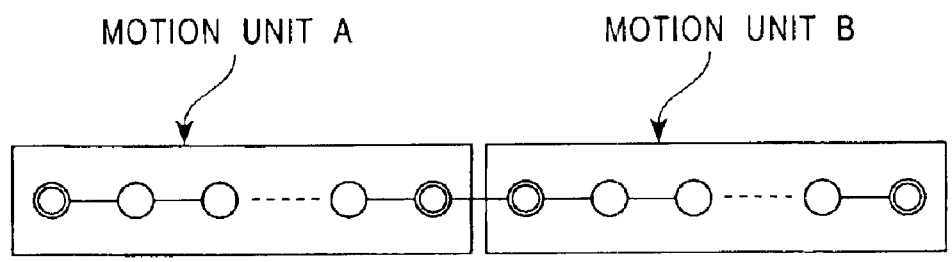
FIG. 9 is a schematic diagram showing a manner in which two continuous motion units are connected to each other.

In the case in which a motion unit A is connected to a motion unit B, when the continuity of the basic dynamic attitude at the end of the motion unit A and the basic dynamic attitude at the start of the motion unit B is ensured, they can be directly connected as shown in FIG. 9.

Figure 10:
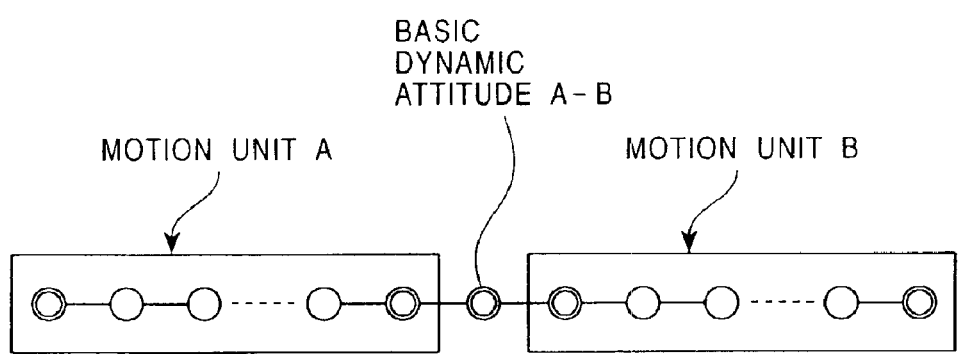
FIG. 10 is a schematic diagram showing an example of a manner in which two discontinuous motion units are connected to each other.

When the continuity of the basic dynamic attitude at the end of the motion unit A and the basic dynamic attitude at the start of the motion unit B cannot be ensured, as shown in FIG. 10, a basic dynamic attitude A-B, which serves to compensate for the gap between the end of the motion unit A and the start of the motion unit B, can be inserted between the motion units A and B. Although not shown in the figure, two or more motion units may also be inserted in order to compensate for the gap between the motion units.

Figure 11:
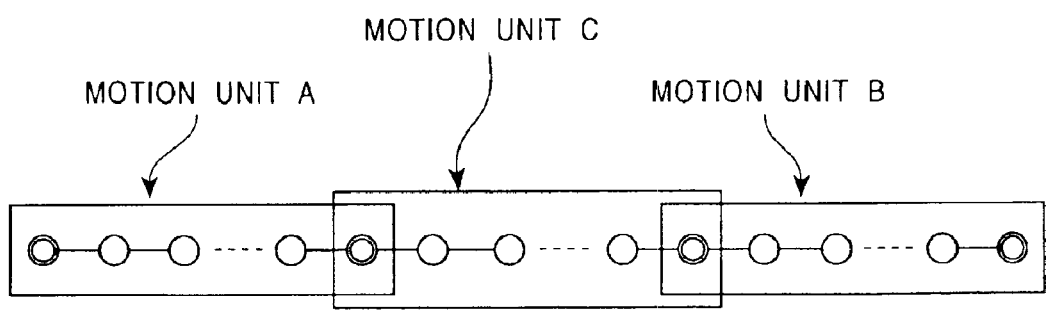
FIG. 11 is a schematic diagram showing another example of a manner in which two discontinuous motion units are connected to each other.

Alternatively, as shown in FIG. 11, a new motion unit C of which one end corresponds to the basic dynamic attitude at the end of the motion unit A and the other end to the basic dynamic attitude at the start of the motion unit B can be generated, and the motion unit C can be inserted between the motion units A and B in order to compensate for the gap therebetween.

Figure 12:
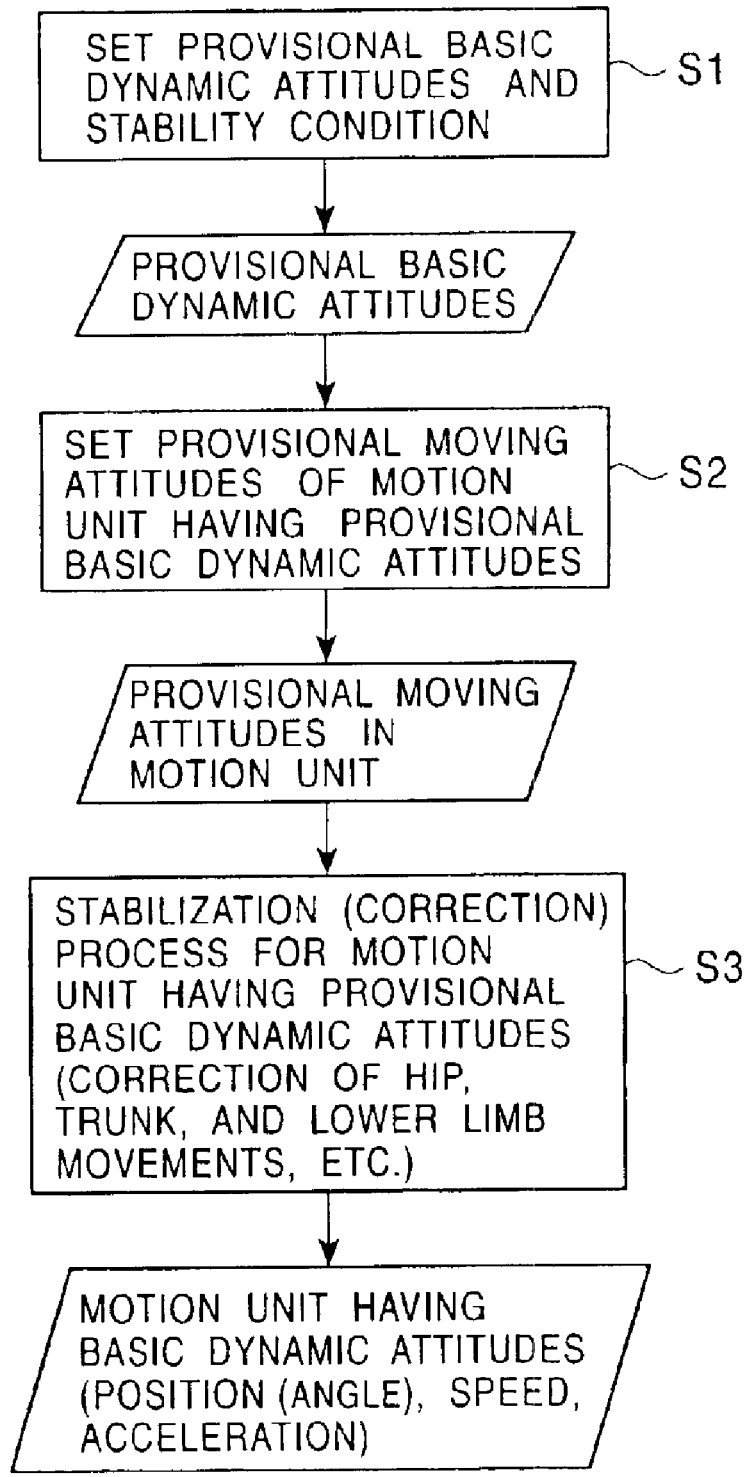
FIG. 12 is a flowchart showing a process for generating a motion unit.

Next, a method for generating a motion unit will be described below with reference to a flowchart shown in FIG. 12.

First, provisional basic dynamic attitudes, which serve as the end points of the motion unit, and a stability condition are set (step S1). More specifically, positions or angles, speeds or angular speeds, and accelerations or angular accelerations of each joint are set provisionally. In setting the stability condition, a ZMP trajectory is used as a stability determination standard.

Next, provisional moving attitudes inserted between the basic dynamic attitudes placed at both ends of the motion unit are set (step S2). More specifically, positions or angles, speeds or angular speeds, and accelerations or angular accelerations of each joint are set provisionally, or positions of each joint is set provisionally.

Next, a stabilization process for the motion pattern of the motion unit having the provisional basic dynamic attitudes is performed. More specifically, hip, trunk, and lower limb motions, etc., of the legged mobile robot 100 are corrected, so that a motion unit having basic dynamic attitudes which include positions (or angles), speeds (or angular speeds), and accelerations (or angular accelerations) of each joint can be obtained (step S3).

The stabilization process for the motion pattern will be described below in detail. When the system accepts only static attitudes (that is, only position data and angle data), the motion unit including the basic dynamic attitudes is converted into a basic static attitude unit including at least three basic static attitudes as a substitute.

Next, the stabilization process performed at step S3 in FIG. 12, that is, a correction process for the hip, trunk, and lower limb motions, etc., of the robot 100 will be described below.

Although the legged mobile robot 100 according to the present embodiment is a collection of infinite number of continuous particles, it is expressed by an approximate model including finite number of discrete particles, so that the amount of calculation in the stabilization process can be reduced. More specifically, the legged mobile robot 100 having an articulated structure with the freedom shown in FIG. 3 is expressed by a multi-mass-points approximate model shown in FIG. 13. The approximate model shown in FIG. 13 is a linear decoupling multi-mass-points approximation model.

Figure 13:
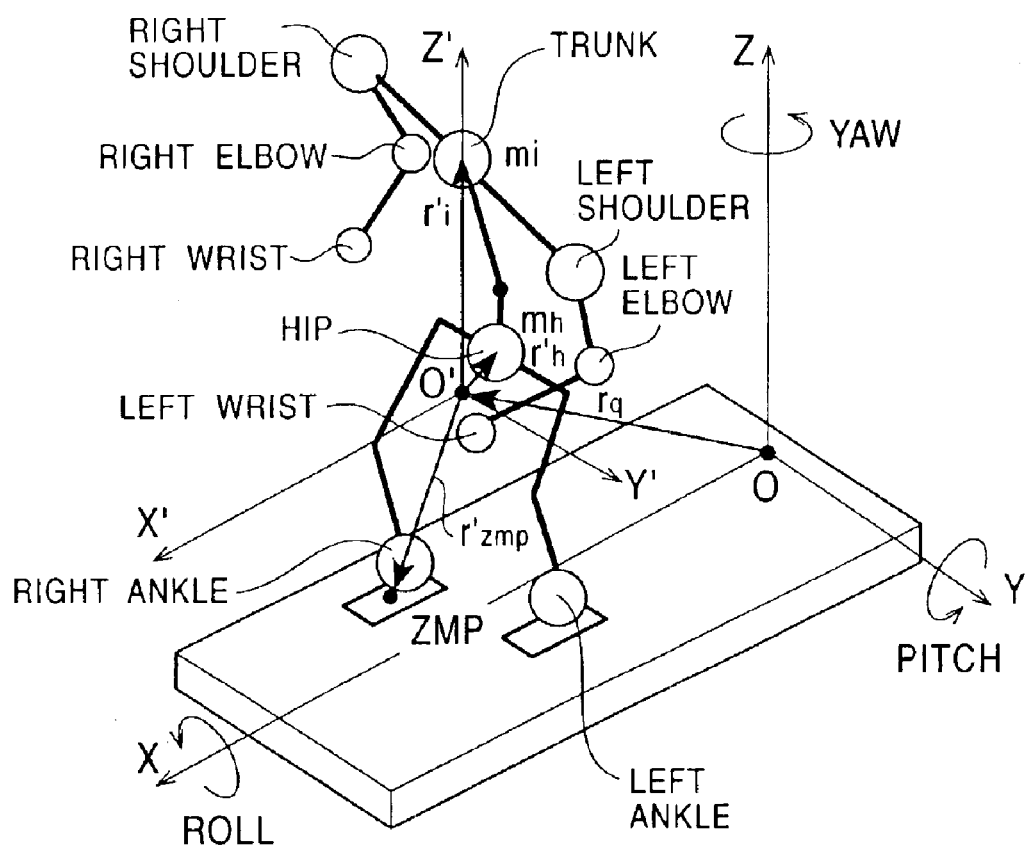
FIG. 13 is a diagram showing a linear decoupling multi-mass-points approximation model of the legged mobile robot 100 used for a stabilization process.

In FIG. 13, the O-XYZ coordinate system shows roll, pitch, and yaw axes in the absolute coordinate system and the O'-X'Y'Z' coordinate system shows roll, pitch, and yaw axes in a moving coordinate system which moves together with the legged mobile robot 100. In FIG. 13, 'i' attached to reference characters show that the corresponding particle is the $i^{th}$ particle in the multi-mass-points model. In addition, $m_i$ shows the mass of the $i^{th}$ particle, and $r'_i$ shows a position vector of the $i^{th}$ particle in the moving coordinate system. In addition, $m_h$ shows the mass of a hip particle, which is important in a hip motion control, which will be described below, $\vec{r}'_h$ ($r'_{hx}$, $r'_{hy}$, $r'_{hz}$) is a position vector of the hip particle, and $\vec{r}'_{zmp}$ is a position vector of the ZMP.

The multi-mass-points model expresses the robot in the form of a wire frame model. As is understood from FIG. 13, the multi-mass-points approximate model includes particles corresponding to the right and left shoulders, the right and left elbows, the right and left wrists, the trunk, the hip, and the right and left ankles. In the non-fidelity, multi-mass-points approximate model shown in FIG. 13, moment equations are described in the form of linear equations. In this linear equation, the pitch axis and the roll axis are irrespective. The multi-mass-points approximate model can be generated by the following processes:

(1) Mass distribution of the overall body of the legged mobile robot 100 is determined, (2) Particles are set either manually by the designer or automatically under predetermined rules, (3) The center of gravity of each region is determined and the position of the center of gravity and mass $m_i$ is assigned to the corresponding particle, (4) Each particle is expressed by a sphere whose center is at the determined position $r_i$ and whose radius is proportional to the determined mass $m_i$, and (5) Spheres corresponding to portions which are linked in actuality are connected with each other.

Figure 14:
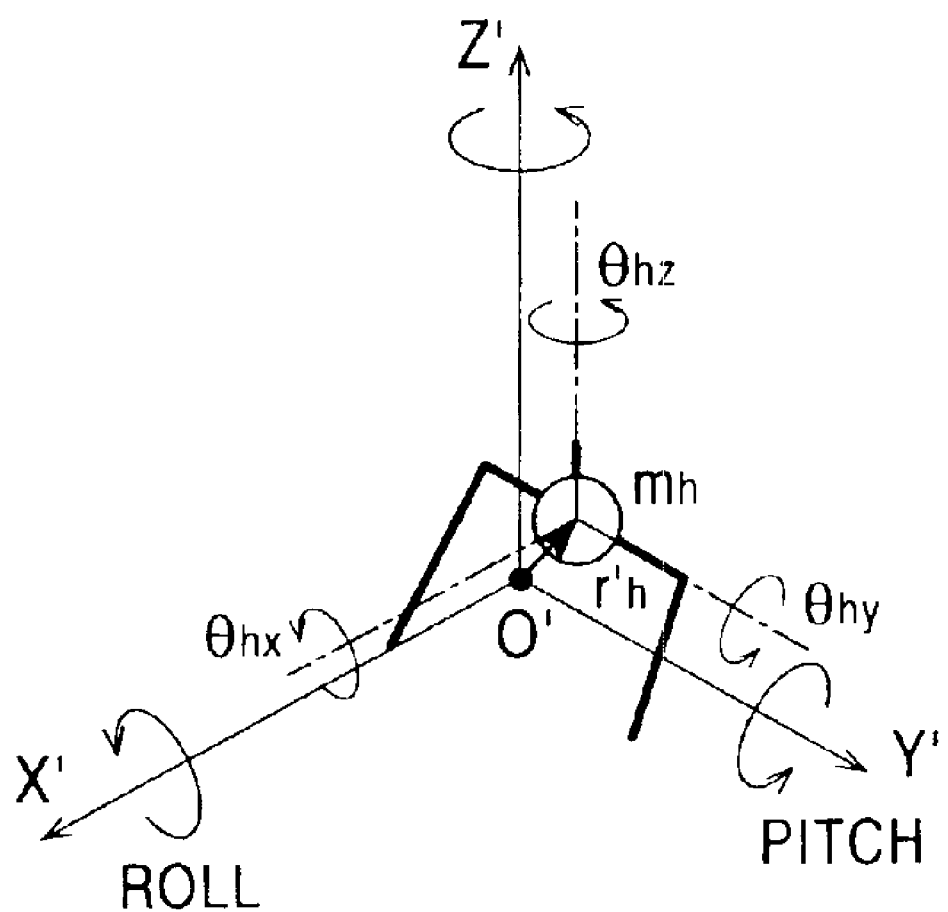
FIG. 14 is an enlarged view of a part around a hip of the multi-mass-points model shown in FIG. 13.

The rotational angles ($\theta_{hx}$, $\theta_{hy}$, $\theta_{hz}$) of hip information in the multi-mass-points model shown in FIG. 13 represent the attitude of the hip of the legged mobile robot 100, that is, rotations around the roll, pitch, and yaw axes (see FIG. 14, which shows an enlarged view of a region around the hip in the multi-mass-points model).

Next, the stabilization process of the legged mobile robot 100 according to the present embodiment, that is, the correction process for the hip, trunk, and lower limb motions, etc., will be described below.

Figure 15:
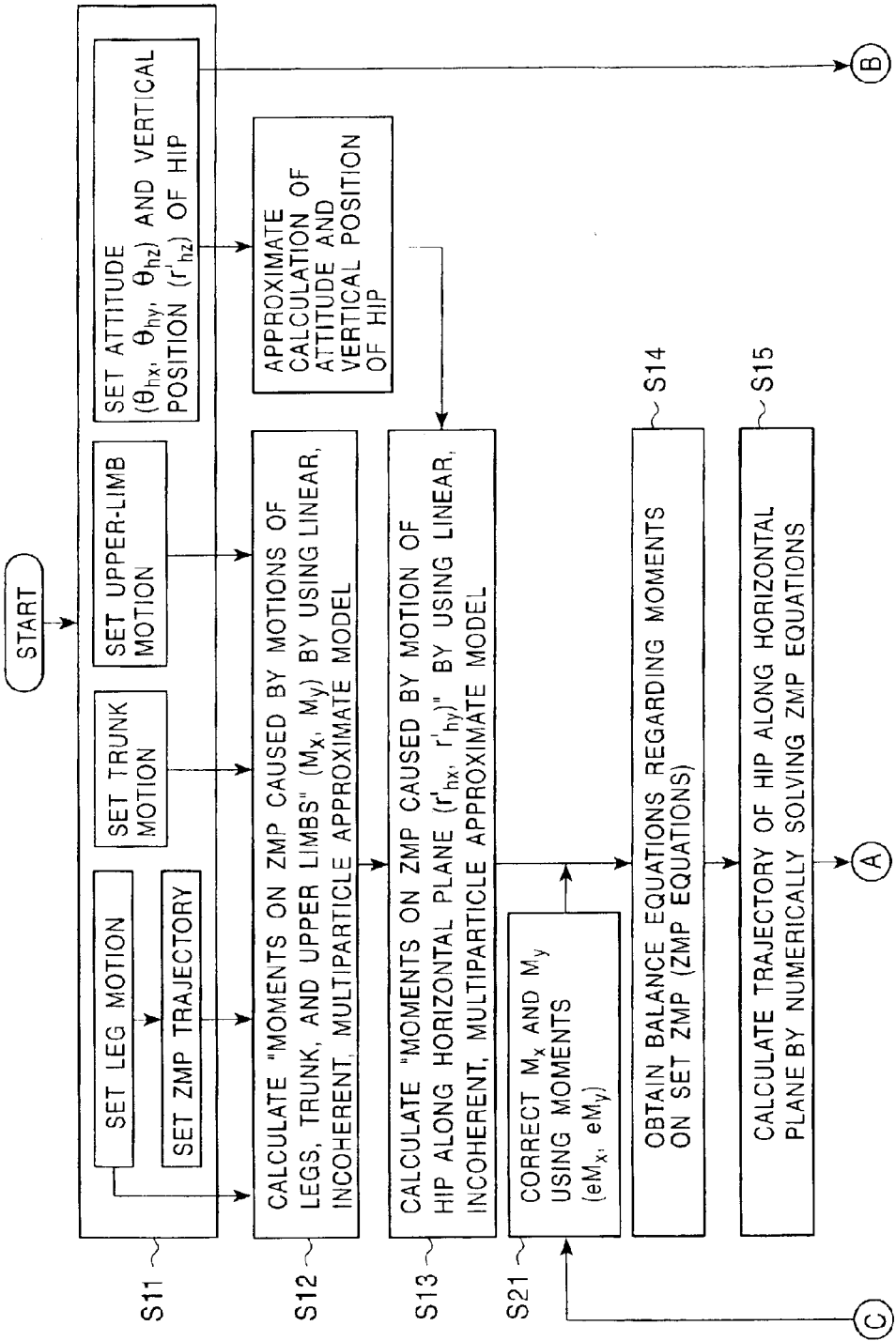
FIGS. 15 and 16 are flowcharts showing an example of a process for generating hip, trunk, and lower limb motions for stable walking of the legged mobile robot 100.
Figure 16:
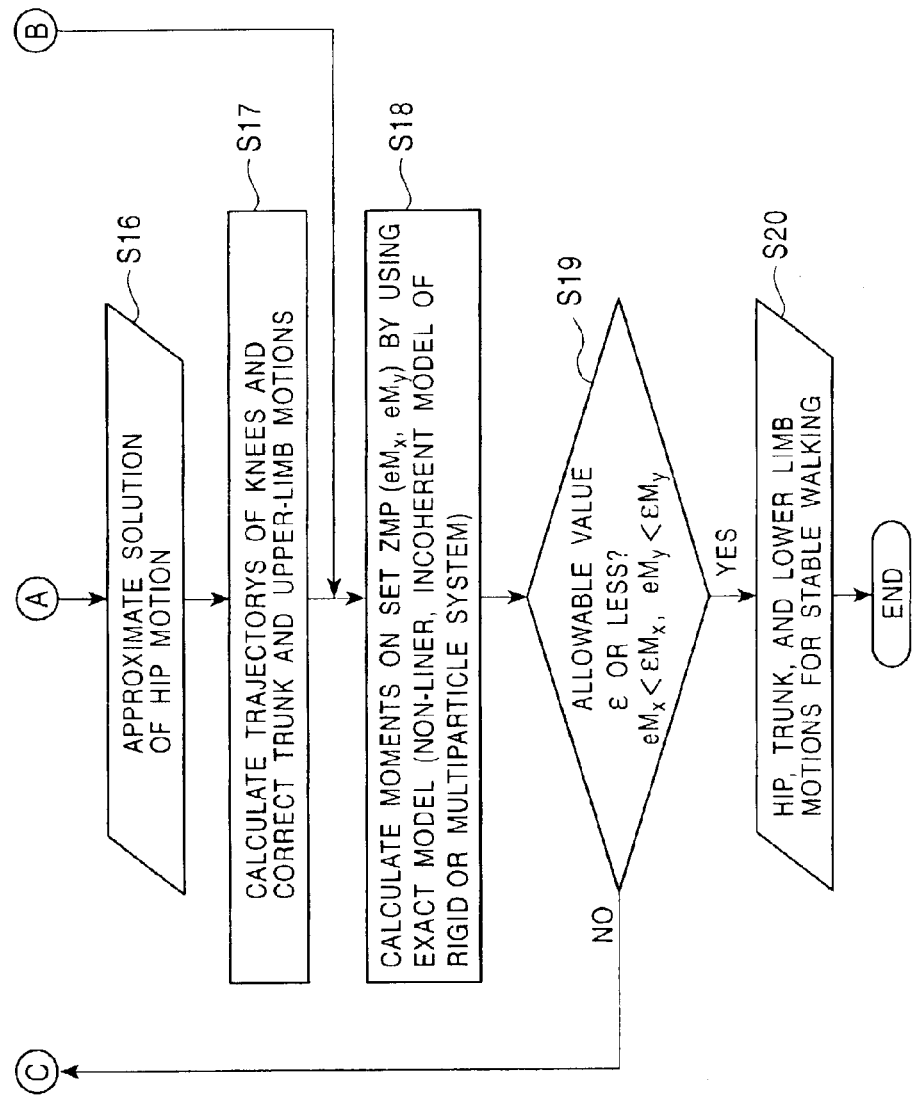

FIGS. 15 and 16 are flowcharts showing an example of a process for generating hip, trunk, and lower limb motions for stable walking of the legged mobile robot 100. In the following descriptions, the position and motion of each joint of the legged mobile robot 100 are expressed by using the linear decoupling multi-mass-points approximation model shown in FIG. 13. In addition, following parameters are used for calculations:

$m_h$: mass of hip particle, $\vec{r}_h'(r_{hx}', r_{hy}', r_{hz}')$: position vector of hip particle, $m_i$: mass of $i^{th}$ particle, $\vec{r}_i'$: position vector of $i^{th}$ particle, $\vec{r}_{zmp}'$: position vector of ZMP, $\vec{g}_h(g_x, g_y, g_z)$: gravity acceleration vector, O'-X'Y'Z': moving coordinate system (coordinate system which moves together with the robot), and O-XYZ: absolute coordinate system, where the dash (') attached to the parameters indicates the moving coordinate system.

In addition, it is assumed that the vertical position of the hip of the robot 100 is constant ($r'_{hz}+r_{qz}$=const), and the hip particle is zero.

First, leg motion (more specifically, sole motion), ZMP trajectory derived from the leg motion, trunk motion, upper-limb motion, hip motion, and attitude and vertical position of the hip, that is, patterns which actually determine the motion of each part are set (step S11). More specifically, a leg motion pattern, a ZMP trajectory, a trunk motion pattern, and an upper limb motion pattern are set in that order. With respect to the hip motion, the motion in the Z' direction is set while the motions in the X' and Y' directions are unknown.

Next, the moments on the ZMP around the pitch axis and the roll axis caused by the leg, trunk, and upper limb motions ($M_x$, $M_y$) are calculated by using the linear decoupling multi-mass-points approximation model (step S12).

Next, the moments on the ZMP caused by the motion of the hip along the horizontal plane ($r'_{hx}$, $r'_{hy}$) is calculated by using the linear decoupling multi-mass-points approximation model (step S13).

Next, balance equations regarding moments on set ZMP in the moving coordinate system O'-X'Y'Z', which moves together with the robot, is derived (step S14). More specifically, the moments around the pitch axis and the roll axis caused by the leg, trunk, and upper limb motions ($M_x$, $M_y$) are put in the right side of equations as known variables, and terms relating to the hip motion along the horizontal plane ($r'_{hx}$, $r'_{hy}$) are put at the left side of the equations as unknown variables. Accordingly, linear decoupling ZMP equations are derived as follows:

$$+m_h H(\ddot{r}'_{hx}+\ddot{r}_{qx}+g_x)-m_h g_z(r'_{hx}-r'_{zmp_x})=-M_y(t)$$
$$-m_h H(\ddot{r}'_{hy}+\ddot{r}_{qy}+g_y)-m_h g_z(r'_{hy}-r'_{zmp_y})=-M_x(t) \quad (1)$$

where $\ddot{r}'_{hz}=0$, and $r'_{hz}+r_{qz}$=const (temporally constant).

Next, the trajectory of the hip along the horizontal plane is calculated by solving ZMP equations (1) (step S15). For example, the absolute position of the hip in the horizontal plane ($r'_{hx}$, $r'_{hy}$) is determined by solving ZMP equation (1) by using a known numerical analysis method such as the Euler method and the Runge-Kutta method. A desired position of the ZMP is normally set to the sole which is in contact with the ground.

When preset trunk and upper limb motions cannot be generated by the calculated approximate solution, the trunk and upper limb motion patterns are corrected and reset (step S17). At this time, trajectorys of knees may also be calculated.

Next, moments on the ZMP around the roll axis and the pitch axis in an exact model (eM$_x$, eM$_y$) are calculated by assigning the whole body motion pattern obtained as described above (step S18). The exact model is a precise model of the legged mobile robot 100 expressed by a rigid body or a system including extremely large number of particles. Although it is assumed that [Equation 3] is satisfied in the above-described non-fidelity model, such assumption is not required in the exact model (that is, it is not necessary to be temporally constant).

The moments in the exact model (eM$_x$, eM$_y$) correspond to errors in the moments which generate around the roll axis and the pitch axis during the hip motion. In the subsequent step, that is, step S19, it is determined whether or not the moments around each axis (eM$_x$, eM$_y$) are less than allowable values of approximate moments in the in non-fidelity model ($\epsilon$M$_x$, $\epsilon$M$_y$). When the moments in the exact model (eM$_x$, eM$_y$) are less the allowable values ($\epsilon$M$_x$, $\epsilon$M$_y$), it means that the exact solutions of stable motion patterns of the hip, the trunk, and the lower limbs and the whole body motion pattern for stable walking are obtained (step S20). Accordingly, the process routine ends.

Conversely, when the moments in the exact model (eM$_x$, eM$_y$) are larger than the allowable values ($\epsilon$M$_x$, $\epsilon$M$_y$) the known moments in the approximate model (M$_x$, M$_y$) are corrected by using the moments in the exact model (eM$_x$, eM$_y$) (step S21), and ZMP equations are derived again. Then, the above-described calculation of the approximate solutions of the hip, trunk, and lower limb motion patterns and corrections thereof are repeated until the moments in the exact model (eM$_x$, eM$_y$) are reduced below the allowable value $\epsilon$.

Figure 17:
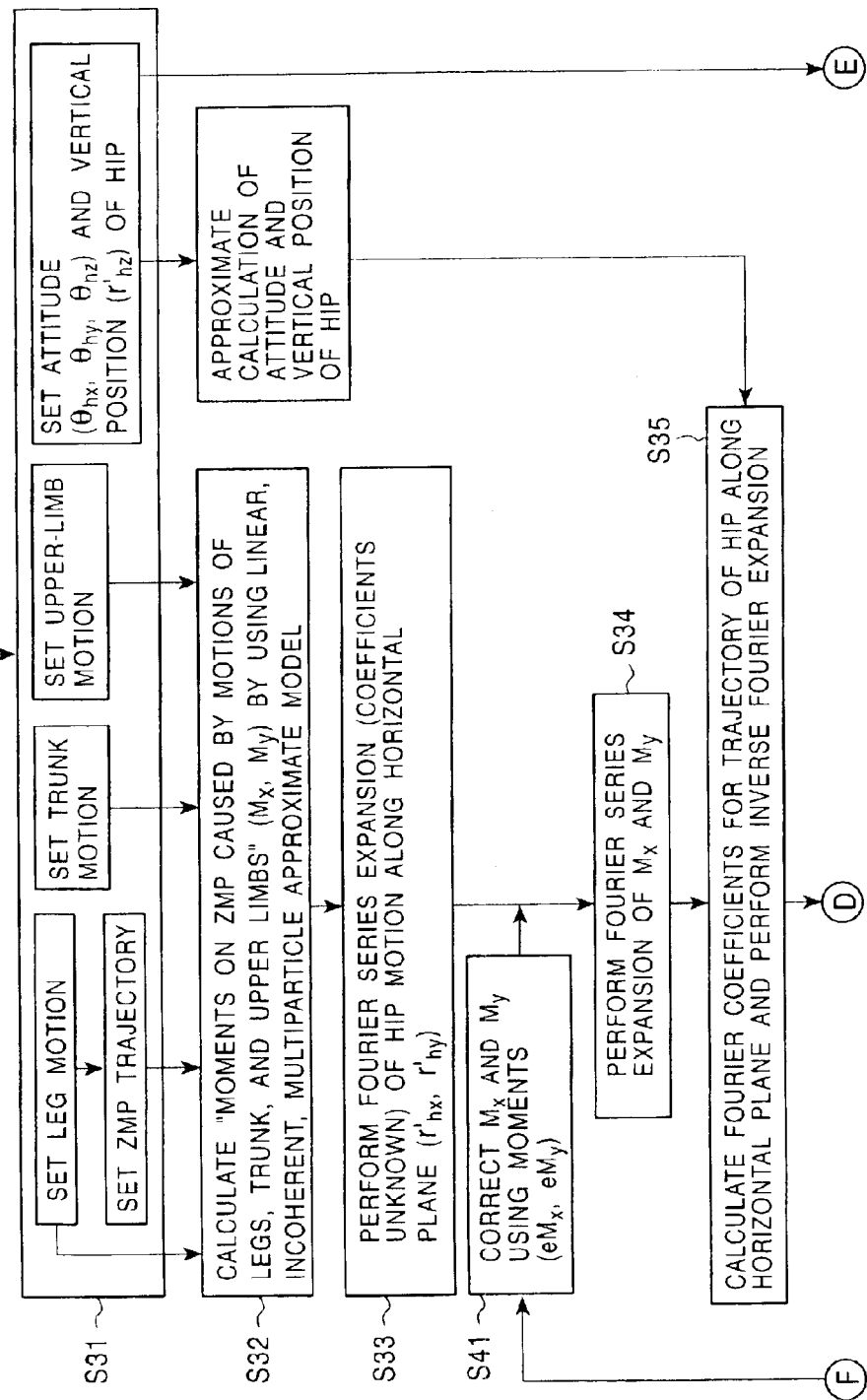
FIGS. 17 and 18 are flowcharts showing another example of a process for generating hip, trunk, and lower limb motions for stable walking of the legged mobile robot 100.
Figure 18:
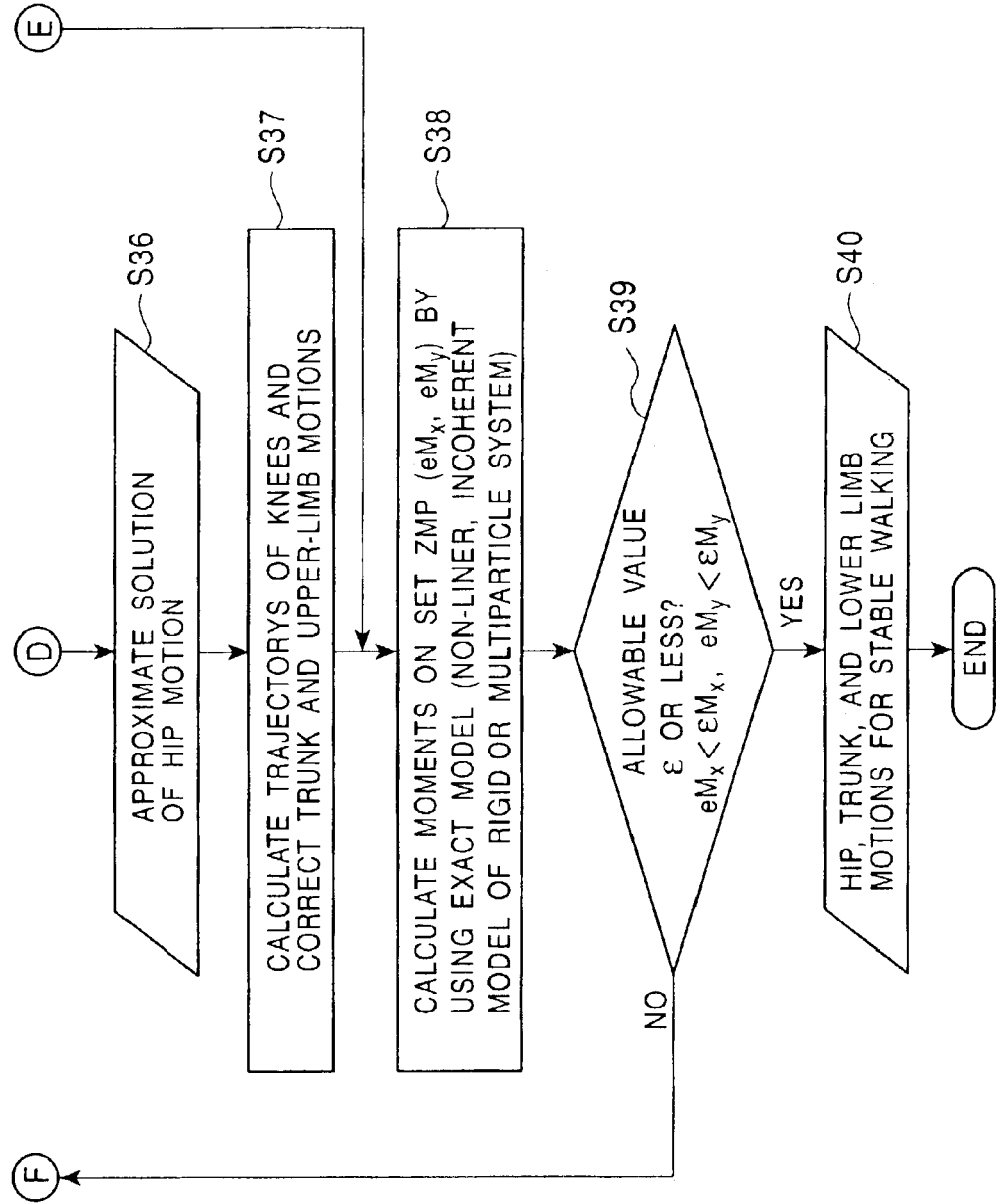

FIGS. 17 and 18 flowcharts showing another example of a process for generating hip, trunk, and lower limb motions for stable walking of the legged mobile robot 100. As explained in the foregoing descriptions, the position and motion of each joint of the robot 100 are expressed by using the linear decoupling multi-mass-points approximation model shown in FIG. 13.

First, leg motion (more specifically, sole motion), ZMP trajectory derived from the leg motion, trunk motion, upper-limb motion, hip motion, and attitude and vertical position of the hip, that is, patterns which actually determine the motion of each part are set (step S31). More specifically, a leg motion pattern, a ZMP trajectory, a trunk motion pattern, and an upper limb motion pattern are set in that order. With respect to the hip motion, the motion in the Z' direction is set while the motions in the X' and Y' directions are unknown.

Next, the moments on the ZMP around the pitch axis and the roll axis caused by the motions of the leg, trunk, and upper limb motions (M$_x$, M$_y$) are calculated by using the linear decoupling multi-mass-points approximation model (step S32) (refer to the foregoing descriptions and FIG. 13).

Next, Fourier series expansion of the motion of the hip along the horizontal plane (r'$_{hx}$, r'$_{hy}$) is performed (step S33). As is well known in the art, time-axis components can be converted into frequency components by Fourier series expansion. More specifically, in the present case, the motion of the hip can be expressed as a periodical motion. In addition, since fast Fourier transform (FFT) can be applied, the calculation speed can be significantly increased.

Next, Fourier series expansion of the moments on the ZMP around the pitch axis and the roll axis (M$_x$, M$_y$) is performed (step S34).

Next, Fourier coefficients for the trajectory of the hip along the horizontal plane are calculated and inverse Fourier expansion is performed (step S35). Accordingly, an approximate solution of the hip motion can be obtained (step S36). The approximate solution obtained at step S36 is an approximate solution of the absolute position of the hip in the horizontal plane (r'$_{hx}$, r'$_{hy}$) which represents the hip motion pattern for stable walking, that is, the absolute hip position such that the ZMP is at a desired position. The desired position of the ZMP is normally set to the sole which is in contact with the ground.

When preset trunk and upper limb motions cannot be generated by the calculated approximate solution, the trunk and upper limb motion patterns are corrected and reset (step S37). At this time, trajectorys of knees may also be calculated.

Next, moments on the ZMP in an exact model (eM$_x$, eM$_y$) are calculated by assigning the whole body motion pattern obtained as described above (step S38). The exact model is a precise model of the legged mobile robot 100 expressed by a rigid body or a system including extremely large number of particles. Although it is assumed that [Equation 3] is satisfied in the above-described non-fidelity model, such assumption is not required in the exact model (that is, it is not necessary to be temporally constant).

The moments in the exact model (eM$_x$, eM$_y$) correspond to errors in moment which generate during the hip motion. In the subsequent step, that is, step S39, it is determined whether or not the moments (eM$_x$, eM$_y$) are less than an allowable values in the approximate model ($\epsilon$M$_x$, $\epsilon$M$_y$). When the moments in the exact model (eM$_x$, eM$_y$) are less the allowable values ($\epsilon$M$_x$, $\epsilon$M$_y$), it means that the exact solutions of stable motion patterns of the hip, the trunk, and the lower limbs and the whole body motion pattern for stable walking are obtained (step S40). Accordingly, the process routine ends.

Conversely, when the moments in the exact model (eM$_x$, eM$_y$) are larger than the allowable values in the approximate model ($\epsilon$M$_x$, $\epsilon$M$_y$), the known moments in the non-fidelity model (M$_x$, M$_y$) are corrected by using the moments in the exact model (eM$_x$, eM$_y$) (step S41). Then, Fourier series expansion is performed again and the above-described calculation of the approximate solutions of the hip, trunk, and lower limb motion patterns and corrections thereof are repeated until the moments in the exact model (eM$_x$, eM$_y$) are reduced below the allowable value $\epsilon$.

As described above, when the system accepts only static attitudes (that is, only position data and angle data), the motion unit including the basic dynamic attitudes may be converted into a basic static attitude unit including at least three basic static attitudes as a substitute. The substitution process using basic static attitudes will be described below.

For example, when a motion unit A and a motion unit B are connected, a plurality of basic static attitudes is generated at the end points of the motion units which are to be connected to each other and at positions close to the end points. Then, the basic dynamic attitudes are substituted for the obtained basic static attitudes.

Figure 19:
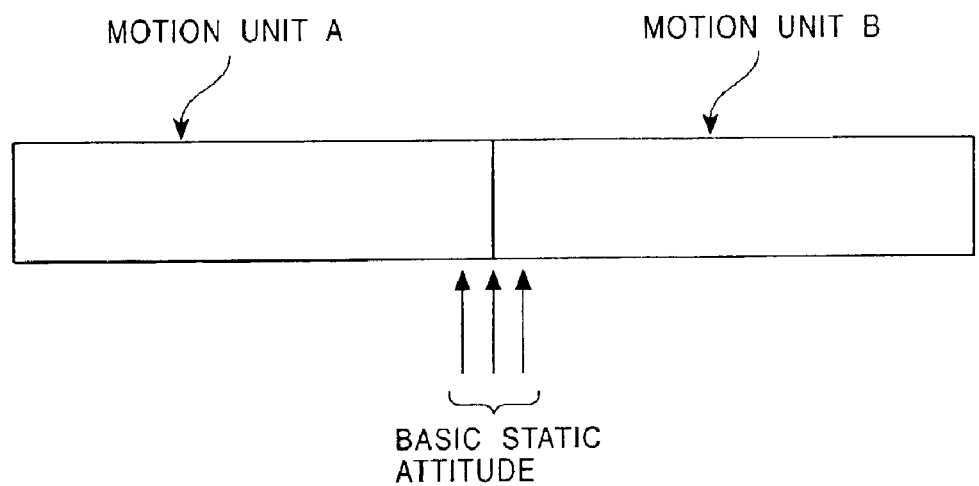
FIG. 19 is a schematic diagram showing a manner in which two continuous motion units are connected in a system which accepts only static attitudes.
Figure 20:
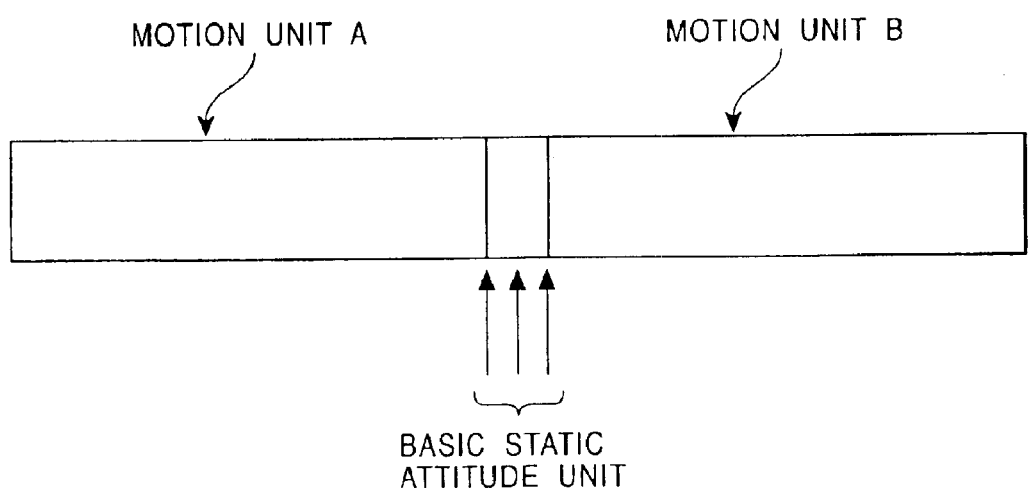
FIG. 20 is a schematic diagram showing a manner in which two discontinuous motion units are connected in a system which accepts only static attitudes.

FIG. 19 is a schematic diagram showing a manner in which two continuous motion units are connected in a system which accepts only static attitudes, and FIG. 20 is a schematic diagram showing a manner in which two discontinuous motion units are connected in a system which accepts only static attitudes. In the case in which two discontinuous motion units are connected in a system which accepts only static attitudes, a new motion unit including only basic static attitudes is generated, the new motion unit having end points which are included in the motion unit A and the motion unit B.

The basic static attitudes can be generated by using polynomial interpolation of fifth order or more and applying information regarding basic dynamic attitudes of the motion units A and B at the end points thereof (that is, positions (or joint angles), speeds (or joint angular speeds), and accelerations (or joint angular accelerations) of each joint) as boundary conditions.

The fifth order polynomial interpolation can be performed by using the following equation:

$$p = a_5 t^5 + a_4 t^4 + a_3 t^3 + a_2 t^2 + a_1 t + a_0$$

A pseudo-program code for obtaining basic static attitudes for which a basic dynamic attitude (an end point of motion unit A) are substituted by using the above-described equation will be described below.

```
//fifth order polynomial interpolation function
unit A position: double y00
unit A speed: double dy00
unit A acceleration: double ddy00
unit A time between basic dynamic attitudes: double tt
basic dynamic attitude position: double ytt
basic dynamic attitude speed: double dytt
basic dynamic attitude acceleration: double ddytt
double func_a0(double y00)
{
double a0;
    a0=y00;
    return a0;
}
double func_a1(double dy00)
{
double a1;
    a1=dy00;
    return a1;
}
double func_a2(double ddy00)
{
double a2;
    a2=ddy00/2.0;
    return a2;
}
double func_a3(double tt, double ddy00, double ddytt, double
              dy00, double dytt, double y00, double ytt)
{
double a3, t2;
    t2=tt*tt;
    a3=-(3.0*t2*ddy00-t2*ddytt+12.0*tt*dy00+8.0*tt*dytt+
         20.0*y00-20.0*ytt)/(2.0*t2*tt)
    return a3;
}
double func_a4(double tt, double ddy00, double ddytt, double
              dy00, double dytt, double y00, double ytt)
{
double a4, t2;
    t2=tt*tt
    a4=(3.0*t2*ddy00-2.0*t2*ddytt+16.0*tt*dy00+14.0*tt*dytt+
        30.0*y00-30.0*ytt)/(2.0*t2*t2);
    return a4;
}
double func_a5(double tt, double ddy00, double ddytt, double
              dy00, double dytt, double y00, double ytt)
{
double a5, t2;
    t2=tt*tt
    a5=-(6.0*(dy00+dytt)*tt+(ddy00-ddytt)*t2+12.0*y00-
         12.0*ytt)/(2.0*t2*t2*tt);
    return a5;
}
//..............................................
/*..............................................
EX.
    a0=func_a0(pxx);
    a1=func_a1(vxx);
    a2=func_a2(axx);
    a3=func_a3(t,ax00,axtt,vx00.vxtt,px00,pxtt);
    a4=func_a4(t,ax00,axtt,vx00,vxtt,px00,pxtt);
    a5=func_a5(t,ax00,axtt,vx00,vxtt,px00,pxtt);
    px=a0+a1*dd+a2*dd2+a3*dd3+a4*dd3*dd+a5*dd3*dd2;
..................................................*/
```

Each basic attitude may of course have an allowable value in a range such that stability of the robot is not affected. Accordingly, the basic static attitude may also be simply generated by using a polynomial equation whose order is less than five or by using linear interpolation.

In the motion-control apparatus and the motion-control method for the legged mobile robot according to the present invention, each motion unit includes acceleration components at the end points thereof. Accordingly, whether or not two motion units can be connected is determined by taking into account the continuity of the accelerations or angular accelerations of each joint in addition to the continuity of the positions or angles and the speeds or angular speeds of each joint.

A comparison between a simulation result of a case in which motion units are connected by taking only the continuity of the positions or angles and the speeds or angular speeds of each joint into account and that of a case in which the accelerations or angular accelerations of each joint is also into taken account as in the present invention will be described below.

Figure 21:
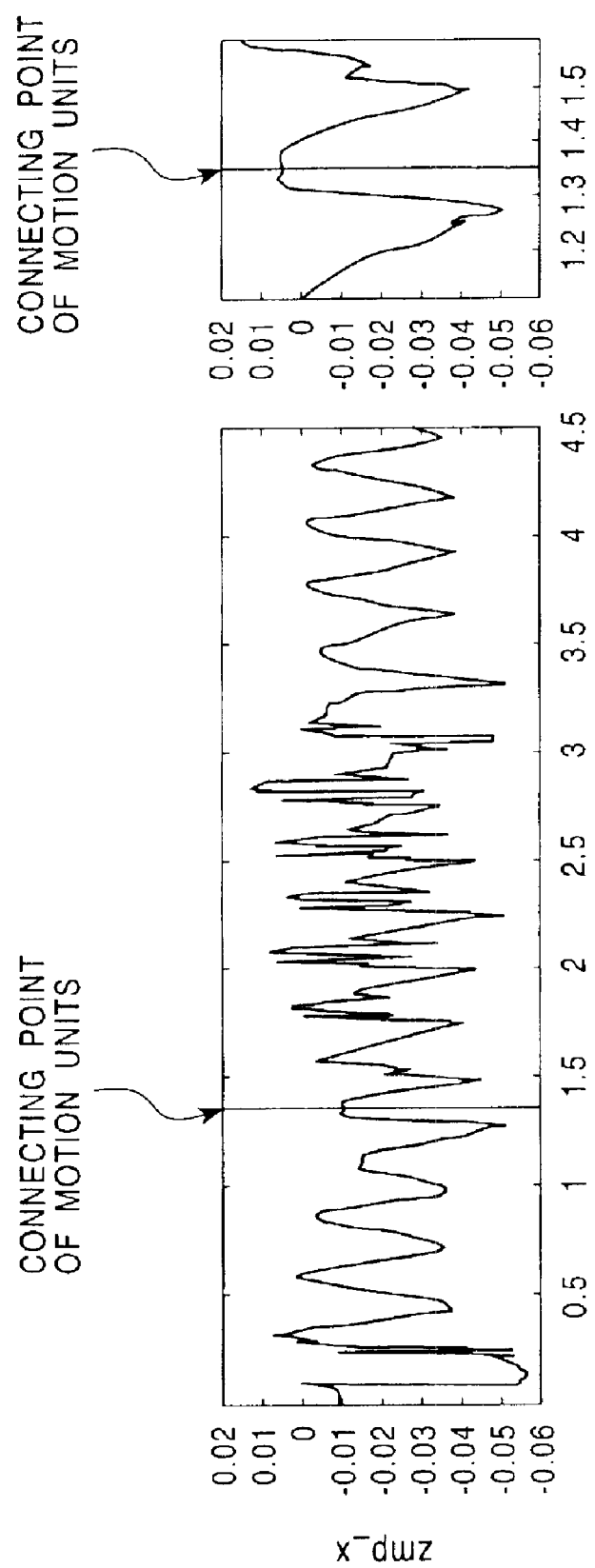
FIGS. 21 and 22 are charts showing the displacements of the ZMP of the robot body in the X and Y directions in the case in which motion units are connected by taking the continuity of the accelerations or angular accelerations of each joint into account.
Figure 22:
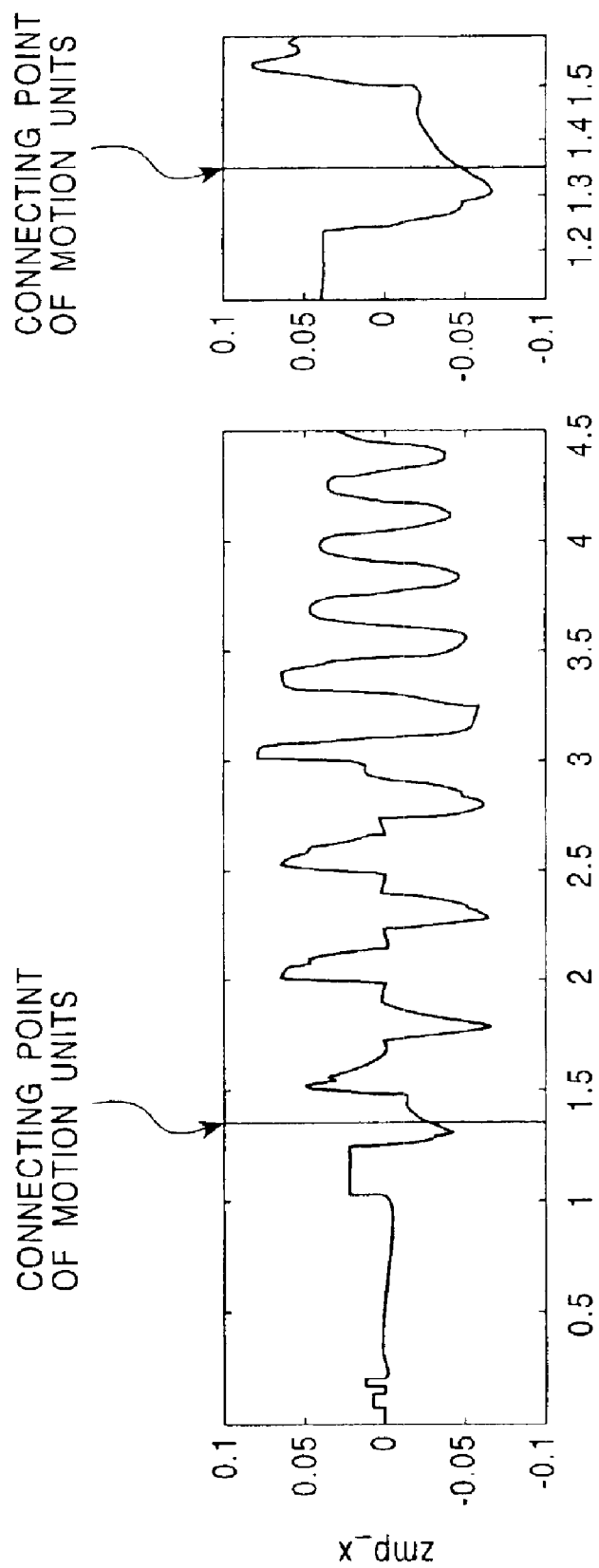

FIGS. 21 and 22 show the displacements of the ZMP of the legged mobile robot in the X and Y directions in the case in which the motion units are connected by taking the continuity of the accelerations or angular accelerations of each joint into account.

Figure 23:
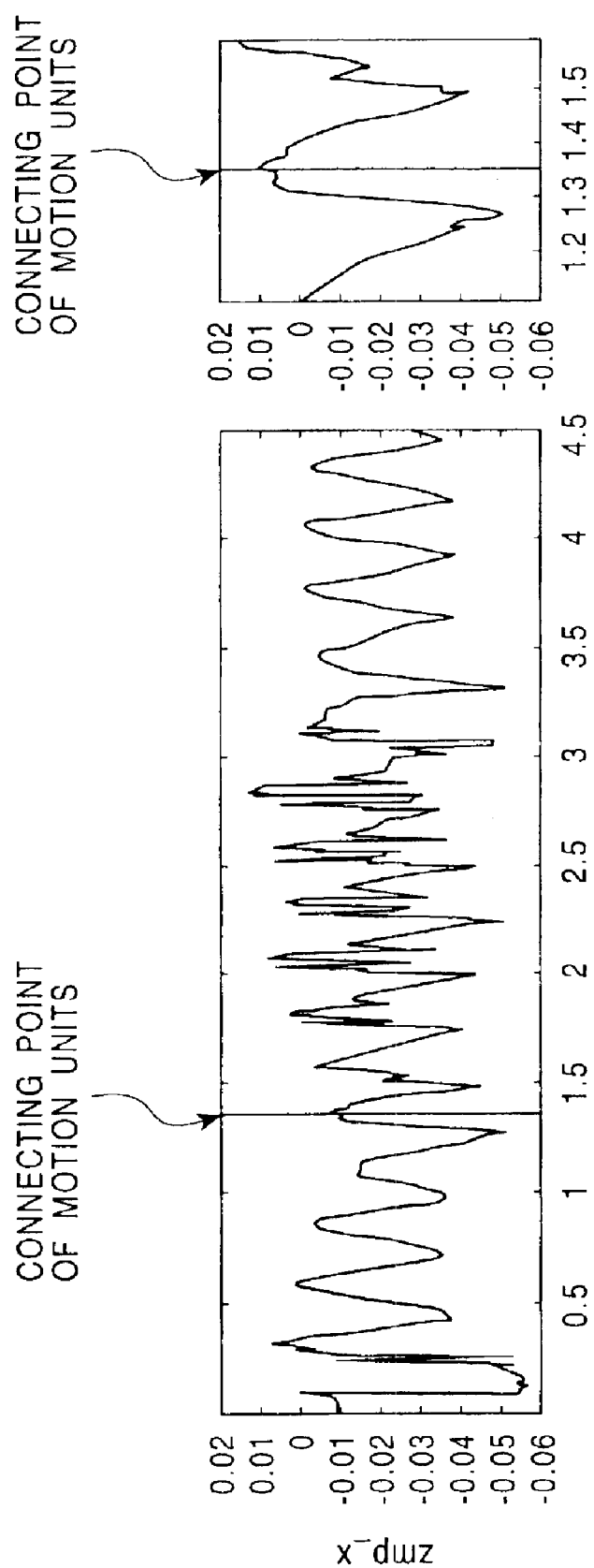
FIGS. 23 and 24 are charts showing the displacements of the ZMP of the robot body in the X and Y directions in the case in which motion units are connected by taking only the continuities of the positions or angles and the speeds or angular speeds of each joint into account.
Figure 24:
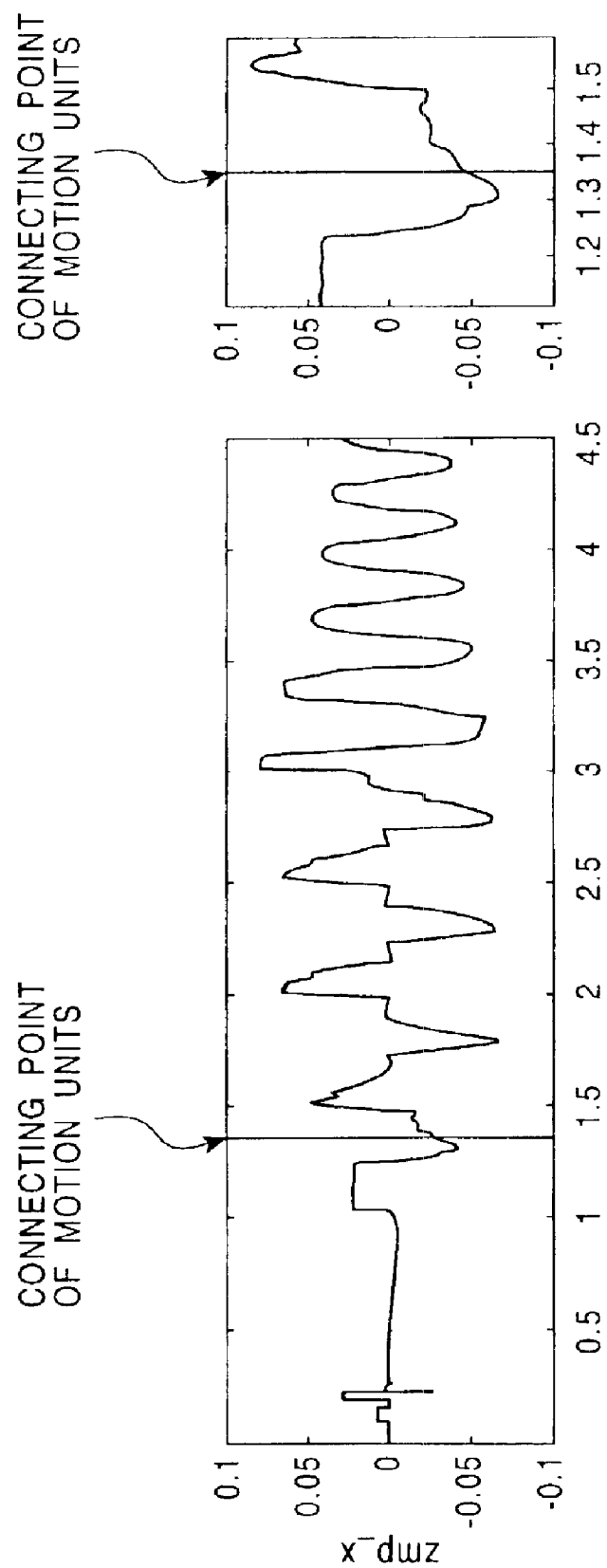

FIGS. 23 and 24 show the displacements of the ZMP of the legged mobile robot in the X and Y directions in the case in which motion units are connected by taking only the continuities of the positions or angles and the speeds or angular speeds of each joint into account.

In each figure, the horizontal axis shows time, and the vertical axis shows the displacement of the ZMP in the X or Y direction. In the horizontal axis, the connecting point of the motion units lies around 1.35. Especially when the displacements of the ZMP in the X direction are compared, it is understood that the motion units are more smoothly connected in the case in which the motion units are connected by taking the accelerations or angular accelerations of each joint into account.

Figure 25:
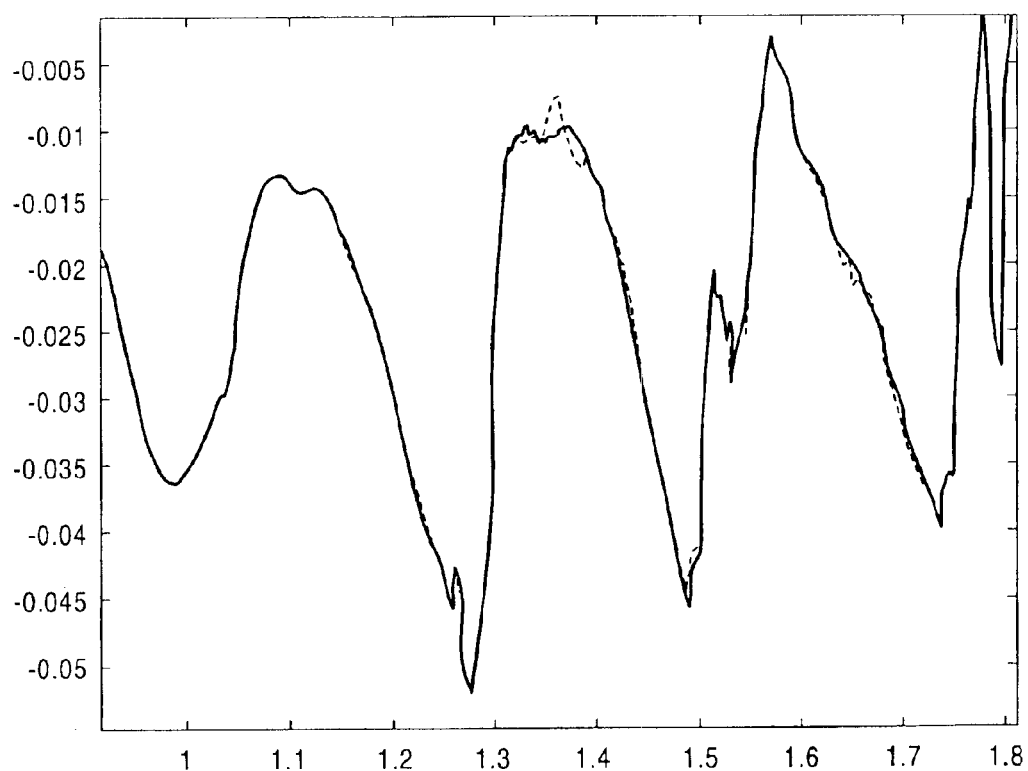
FIG. 25 is a chart showing the displacements of the ZMP in the X direction in which motion units are connected by taking the accelerations or angular accelerations of each joint into account and in a case in which motion units are connected by taking only the continuities of the positions or angles and the speeds or angular speeds of each joint into account, where parts around a connecting point of the motion units are enlarged.

FIG. 25 shows the displacements of the ZMP in the X direction in which parts around the connecting point of the motion units are enlarged. The solid line shows the case in which the continuity of the accelerations or angular accelerations of each joint is taken into account and the dashed line shows the case in which only the continuities of the positions or angles and the speeds or angular speeds of each joint are taken into account. As shown in the figure, the motion units are smoothly connected in the case in which the continuity of the accelerations or angular accelerations of each joint is taken into account and a spike component, where the position of the ZMP suddenly changes, is generated and the motion units are not smoothly connected in the case in which only the continuities of the positions or angles and the speeds or angular speeds of each joint are taken into account.

The difference of whether or not the accelerations or angular accelerations of each joint are taken into account when motion units are connected significantly appears in the case in which the robot body moves fast, for example, when the robot runs or jumps. When the robot body moves fast, the acceleration components cannot be ignored. However, if the motion units are connected without taking the acceleration components into account, the acceleration components affect the robot body as disturbances and stable motion may be degraded when the motion units are connected. In addition, there is also a risk in that connecting points between motion units will be greatly limited due to the effects of the acceleration components.

Appendix

Although the present invention has been described above in detail in conjunction with a particular embodiment, various amendments and modifications can of course be made by those skilled in the art within the scope of the present invention.

The present invention is not limited to products called "robots", and may be applied to any kinds of mechanical apparatuses which move similarly to human beings by making use of electric or magnetic actions. For example, the present invention may also be applied to toys, etc., which belong to other industrial fields.

More specifically, the foregoing descriptions merely illustrate the present invention, and are not intended to limit the scope of the present invention. The substance of the present invention should be determined by claims stated at the top.

[Industrial Applicability]

According to the present invention, an excellent motion-control apparatus and an excellent motion-control method for a legged mobile robot which has an articulated structure and which performs predetermined action sequences by time-sequentially moving each joint can be provided.

In addition, according to the present invention, an excellent motion-control apparatus, an excellent motion-control method, and an excellent method for generating a motion unit for a legged mobile robot which performs predetermined action sequences by using basic motion units which include time-sequential motion of each joint and compound motion units in which basic motions are combined can be provided.

In addition, according to the present invention, an excellent motion-control apparatus, an excellent motion-control method, and an excellent method for generating a motion unit for a legged mobile robot which performs predetermined action sequences by connecting motion units without degrading the stability of the robot body even during fast motion in which acceleration components cannot be ignored can be provided.

FIG. 4
30: HEAD UNIT
80: CONTROL UNIT
50L: LEFT ARM UNIT
51L: LEFT UPPER ARM UNIT
52L: LEFT ELBOW JOINT UNIT
53L: LEFT FOREARM UNIT
60L: LEFT LEG UNIT
61L: LEFT THIGH UNIT
62L: LEFT KNEE JOINT UNIT
63L: LEFT ANKLE UNIT
50R: RIGHT ARM UNIT
51R: RIGHT UPPER ARM UNIT
52R: RIGHT ELBOW JOINT UNIT
53R: RIGHT FOREARM UNIT
60R: RIGHT LEG UNIT
61R: RIGHT THIGH UNIT
62R: RIGHT KNEE JOINT UNIT
63R: RIGHT ANKLE UNIT

What is claimed is:

1. An apparatus for controlling a motion of a legged mobile robot having an articulated structure with at least a plurality of movable legs, comprising:
    an action-sequence generating unit which generates an action sequence by using motion units which store time-sequential motion of each joint; and
    a motion control unit which controls the motion of each joint in accordance with the action sequence generated;
    wherein each motion unit is constructed of basic dynamic attitudes and one or more moving attitudes, the basic dynamic attitudes including at least accelerations or angular accelerations of each joint at the end points of the motion unit, the end points corresponding to the start and the end of the motion, and the moving attitudes connecting the basic dynamic attitudes placed at the end points.

2. An apparatus for controlling a motion of a legged mobile robot according to claim 1, wherein, in connecting two motion units, the action-sequence generating unit takes into account at least the continuity of the accelerations or the angular accelerations of each joint between the basic dynamic attitudes at the end points of the motion units which are to be connected.

3. An apparatus for controlling a motion of a legged mobile robot according to claim 1, wherein, in connecting two motion units, the action-sequence generating unit takes into account at least the continuity of the accelerations or the angular accelerations of each joint between the end points of the motion units which are to be connected, and, if the basic dynamic attitudes are not continuous, another basic dynamic attitude, which ensures the continuity, is inserted between the motion units.

4. An apparatus for controlling a motion of a legged mobile robot according to claim 1, wherein, in connecting two motion units, the action-sequence generating unit takes into account at least the continuity of the accelerations or the angular accelerations of each joint between the basic dynamic attitudes at the end points of the motion units which are to be connected, and, if the basic dynamic attitudes are not continuous, one or more moving attitudes, which ensure the continuity, are inserted between the motion units.

5. An apparatus for controlling a motion of a legged mobile robot according to claim 1, wherein, in connecting two motion units, the action-sequence generating unit takes into account at least the continuity of the accelerations or the angular accelerations of each joint between the basic dynamic attitudes at the end points of the motion units which are to be connected, and, if the basic dynamic attitudes are not continuous, another motion unit, which ensures the continuity, is inserted between the motion units.

6. An apparatus for controlling a motion of a legged mobile robot according to claim 1, further comprising a attitude data converting unit which converts the basic dynamic attitude into one or more static attitude data items,
    wherein the motion control unit controls the motion of each joint in accordance with the static attitude data items.

7. A method for controlling a motion of a legged mobile robot having an articulated structure with at least a plurality of movable legs, comprising:
    an action-sequence generating step in which an action sequence is generated by using motion units which store time-sequential motion of each joint; and a motion controlling step in which the motion of each joint is controlled in accordance with the action sequence generated;

wherein each motion unit is constructed of basic dynamic attitudes and one or more moving attitudes, the basic dynamic attitudes including at least accelerations or angular accelerations of each joint at the end points of the motion unit corresponding to the start and the end of the motion, and the moving attitudes connecting the basic dynamic attitudes placed at the end points.

8. A method for controlling a motion of a legged mobile robot according to claim 7, wherein, in the action-sequence generating step, at least the continuity of the accelerations or the angular accelerations of each joint between the basic dynamic attitudes at the end points of the motion units which are to be connected is taken into account.

9. A method for controlling a motion of a legged mobile robot according to claim 7, wherein, in the action-sequence generating step, at least the continuity of the accelerations or the angular accelerations of each joint between the basic dynamic attitudes at the end points of the motion units which are to be connected is taken into account, and, if the basic dynamic attitudes are not continuous, another basic dynamic attitude, which ensures the continuity, is inserted between the motion units.

10. A method for controlling a motion of a legged mobile robot according to claim 7, wherein, in the action-sequence generating step, at least the continuity of the accelerations or the angular accelerations of each joint between the basic dynamic attitudes at the end points of the motion units which are to be connected is taken into account, and, if the basic dynamic attitudes are not continuous, one or more moving attitudes, which ensure the continuity, are inserted between the motion units.

11. A method for controlling a motion of a legged mobile robot according to claim 7, wherein, in the action-sequence generating step, at least the continuity of the accelerations or the angular accelerations of each joint between the basic dynamic attitudes at the end points of the motion units which are to be connected is taken into account, and, if the basic dynamic attitudes are not continuous, another motion unit, which ensures the continuity, is inserted between the motion units.

12. A method for controlling a motion of a legged mobile robot according to claim 7, further comprising a attitude data converting step in which the basic dynamic attitude is converted into one or more static attitude data items, wherein, in the motion controlling step, the motion of each joint is controlled in accordance with the static attitude data items.

* * * * *